(12) United States Patent
Bellegarda et al.

(10) Patent No.: US 10,282,416 B2
(45) Date of Patent: May 7, 2019

(54) UNIFIED FRAMEWORK FOR TEXT CONVERSION AND PREDICTION

(71) Applicant: Apple Inc., Cupertino, CA (US)

(72) Inventors: Jerome R. Bellegarda, Saratoga, CA (US); Jannes G. Dolfing, Daly City, CA (US); Xin Wang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/673,587

(22) Filed: Aug. 10, 2017

(65) Prior Publication Data

US 2018/0322112 A1    Nov. 8, 2018

Related U.S. Application Data

(60) Provisional application No. 62/502,120, filed on May 5, 2017.

(51) Int. Cl.
  *G06F 17/27* (2006.01)
  *G06F 17/28* (2006.01)
  *G06F 17/22* (2006.01)

(52) U.S. Cl.
  CPC ........ *G06F 17/276* (2013.01); *G06F 17/2217* (2013.01); *G06F 17/2735* (2013.01); *G06F 17/2818* (2013.01)

(58) Field of Classification Search
  CPC . G06F 17/276; G06F 17/2735; G06F 17/2818
  USPC .......................... 715/256, 259, 262, 264, 265
  See application file for complete search history.

(56) References Cited

U.S. PATENT DOCUMENTS

2015/0370780 A1* 12/2015 Wang ............... G06F 17/276
                                                        704/9

OTHER PUBLICATIONS

Ujjwal Karn; An Intuitive Explanation of Convolutional Neural Networks; Aug. 11, 2016; The Data Science Blog; pp. 1-21.*

* cited by examiner

Primary Examiner — Andrew R Dyer
(74) Attorney, Agent, or Firm — Dentons US LLP

(57) ABSTRACT

The present disclosure generally relates to integrated text conversion and prediction. In an example process, a current character input of a first writing system is received. A first current character context in the first writing system is determined based on the current character input and a first previous character context in the first writing system. A second current character context in a second writing system is determined based on the first current character context, a second previous character context in the second writing system, and a character representation in the second writing system. A current word context in the second writing system is determined based on the second current character context, a previous word context in the second writing system, and a word representation in the second writing system. Based on the current word context, a probability distribution over a word inventory in the second writing system is determined.

49 Claims, 16 Drawing Sheets

UNIFIED FRAMEWORK FOR TEXT CONVERSION AND PREDICTION

CROSS-REFERENCE TO RELATED APPLICATIONS

This application claims priority from U.S. Provisional Ser. No. 62/502,120, filed on May 5, 2017, entitled "UNIFIED FRAMEWORK FOR TEXT CONVERSION AND PREDICTION," which is hereby incorporated by reference in its entirety for all purposes.

FIELD

The present disclosure relates generally to systems and processes for entering text, and more specifically to techniques for unified text conversion and prediction.

BACKGROUND

For many languages, such as Chinese and Japanese, text can be phonetically entered with one writing system and converted for display in a second writing system. For example, Pinyin is a phonetic system for transcribing Mandarin Chinese using the Latin alphabet. In a Pinyin transliteration, the phonetic pronunciations of Chinese Hanzi characters can be mapped to syllables composed of Latin letters. Neglecting tonal distinctions, Chinese Hanzi characters are pronounced using an inventory of fewer than 500 distinct syllables, so inevitably many homophones arise. For example, the following Chinese Hanzi characters are all pronounced using the same syllable represented by the Pinyin "ji": 鸡 (chicken), 机 (machine), 基 (basic), 击 (to hit), 饥 (hunger), and 积 (accumulate). Clearly these Chinese Hanzi characters are all quite distinct both visually and semantically. To input a desired Chinese Hanzi character using Pinyin, users often need to peruse a potentially long list of possible Chinese Hanzi characters or words and select the intended one. This can especially be the case when the desired Chinese Hanzi character or word does not appear at the beginning of the list. As a result, inputting Chinese text using Pinyin can be slow and inefficient. Such inefficiencies can similarly be experienced for other languages where phonetic text input of one writing system is converted into a second writing system for display.

BRIEF SUMMARY

Systems and processes for unified text conversion and prediction are provided. In an example process, a current character input of a character input sequence is received, the character input sequence representing characters of a first writing system. A first current character context in the first writing system is determined based on the received current character input and a first previous character context in the first writing system. A second current character context in a second writing system is determined based on the first current character context in the first writing system, a second previous character context in the second writing system, and a character representation in the second writing system for the current character input. A current word context in the second writing system is determined based on the second current character context in the second writing system, a previous word context in the second writing system, and a word representation in the second writing system for the character representation. Based on the current word context in the second writing system, a probability distribution over a word inventory in the second writing system is determined. One or more word sequences in the second writing system for the character input sequence are determined based on the probability distribution over the word inventory. The one or more word sequences are provided for output.

Determining the first current character context in the first writing system based on the received current character input and the first previous character context can improve the accuracy and robustness of text conversion and prediction. In particular, it can enable the history of character input (e.g., the first previous character context a(t−1), described below with reference to FIGS. 7A-7B) to inform text prediction and conversion. As a result, the operability of the electronic device can be enhanced where text prediction and conversion are performed with greater accuracy and reliability on the device.

Determining the second current character context in the second writing system based on the first current character context, the second previous character context, and a character representation can also improve the accuracy and robustness of text conversion and prediction. In particular, it can allow for text conversion and text prediction to be more tightly coupled, where text conversion can be informed by word level information and text prediction can be more comprehensively based on text conversion results. As a result, the operability of the electronic device can be enhanced where text prediction and conversion are performed with greater accuracy and reliability on the device.

Determining the current word context in the second writing system based on the second current character context, the previous word context, and the word representation can also improve the accuracy and robustness of text conversion and prediction. In particular, it can allow for text conversion and text prediction to be more tightly coupled, where text conversion can be informed by word level information and text prediction can be more comprehensively based on text conversion results. As a result, the operability of the electronic device can be enhanced where text prediction and conversion are performed with greater accuracy and reliability on the device.

Executable instructions for performing these functions are, optionally, included in a non-transitory computer-readable storage medium or other computer-program product configured for execution by one or more processors. Executable instructions for performing these functions are, optionally, included in a transitory computer-readable storage medium or other computer program product configured for execution by one or more processors.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
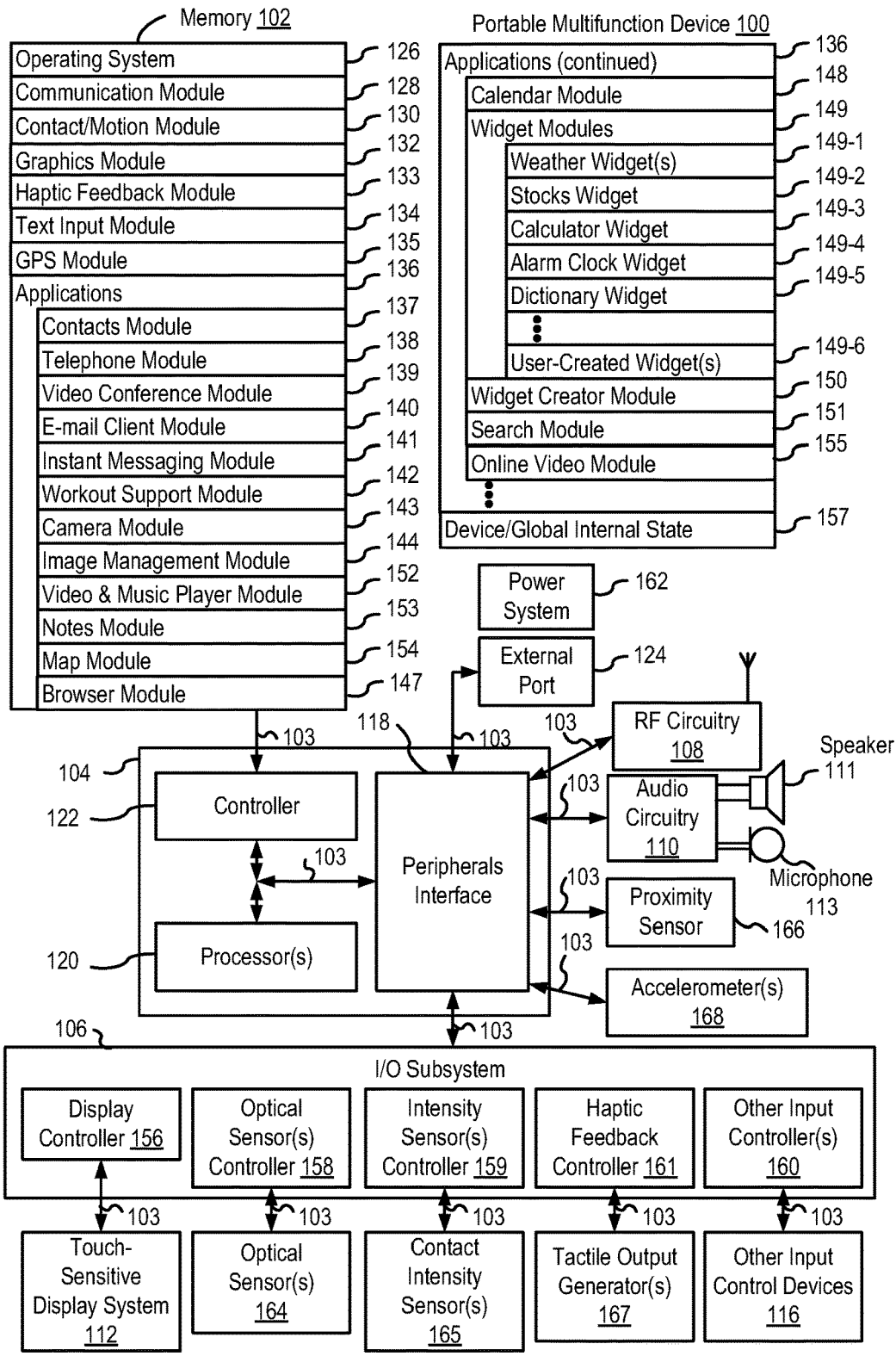
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

As discussed above, inputting text that requires conversion from a first writing system to a second writing system can be slow and inefficient. In some cases, using statistical language models can help in more accurately predicting the current character/word that the user is intending to input. For example, language models based on recurrent neural networks (RNNs) can be implemented to account for long-distance dependencies and thus, more robustly estimate the probability of occurrence of any observed word sequence in the language.

In some conventional text conversion and prediction solutions, text conversion and text prediction are decomposed into a series of two separate operations. For example, as shown in Table 1 below, if the user were to enter the Pinyin input "ping guo zai zhong guo," these conventional solutions would first convert the Pinyin input into a lattice of Chinese Hanzi characters at an initial text conversion stage. The lattice of Chinese Hanzi includes many candidate Chinese Hanzi sequences (e.g., "苹果在中国") that each correspond to the Pinyin input. The lattice of Chinese Hanzi characters can then be processed at a separate text prediction stage using a word language model to determine candidate Chinese word sequences (e.g., "苹果 (apple) 在 (in) 中国 (China)").

TABLE 1

| Pinyin Sequence | ping | guo | zai | zhong | guo |
|---|---|---|---|---|---|
| Hànzì Sequence | 苹 | 果 | 在 | 中 | 国 |
| Word Sequence | 苹果 | | 在 | | 中国 |

By performing text conversion and text prediction as separate operations, the ranking schemes implemented at each operation can be suboptimal and lacking complementarity, which can restrict and compromise the process for selecting suitable word sequences for display to the user. Moreover, to maintain tractability, the Chinese Hanzi lattice may be pruned at the text conversion stage such that only the most likely character sequences are provided to the text prediction stage. Thus, the text prediction stage can only provide a partial solution based on the Chinese Hanzi characters that survived pruning at the text conversion stage. As a result, each stage operates under intrinsic restrictions: the text conversion stage may have inherently limited accuracy without access to word information, and the text prediction stage may only rescore hypotheses that have survived initial conversion-level pruning, which can be more or less aggressive depending on resource constraints. It can thus be advantageous to more tightly couple text conversion and text prediction in a single unified framework to enable more accurate and robust text conversion and prediction.

In accordance with some embodiments, unified text conversion and prediction frameworks are described herein. In some examples, the unified text conversion and prediction solution is implemented in a single end-to-end neural network having a stacked configuration that nests three sub-networks: a first character-level sub-network, a second character-level sub-network, and a word-level sub-network (e.g., network 700). Such a solution can offer a way for word-level prediction information to inform character-level conversion, while at the same time bypassing the need for character pruning. In addition, the solution can enable a seamless integration of character conversion with word prediction by allowing for a joint optimization of all network parameters at the same time. Such joint optimization can improve the consistency of character and word ranking at any given time step, regardless of the rationale for ranking (conversion or prediction). In addition, there may be only one cost function at the output of the network, and thus efficiency is gained by just propagating the same architecture and optimizing all the parameters for the single system.

In an exemplary process for unified text conversion and prediction, a current character input of a character input sequence is received, the character input sequence representing characters of a first writing system. A first current character context in the first writing system is determined based on the received current character input and a first previous character context in the first writing system. A second current character context in a second writing system is determined based on the first current character context in the first writing system, a second previous character context in the second writing system, and a character representation in the second writing system for the current character input. A current word context in the second writing system is determined based on the second current character context in the second writing system, a previous word context in the second writing system, and a word representation in the second writing system for the character representation. Based on the current word context in the second writing system, a probability distribution over a word inventory in the second writing system is determined. One or more word sequences in the second writing system for the character input sequence are determined based on the probability distribution over the word inventory. The one or more word sequences are provided for output.

Although the following description uses terms "first," "second," etc. to describe various elements, these elements should not be limited by the terms. These terms are only used to distinguish one element from another. For example, a first input could be termed a second input, and, similarly, a second input could be termed a first input, without departing from the scope of the various described embodiments. The first input and the second input are both inputs, but they are not the same input.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
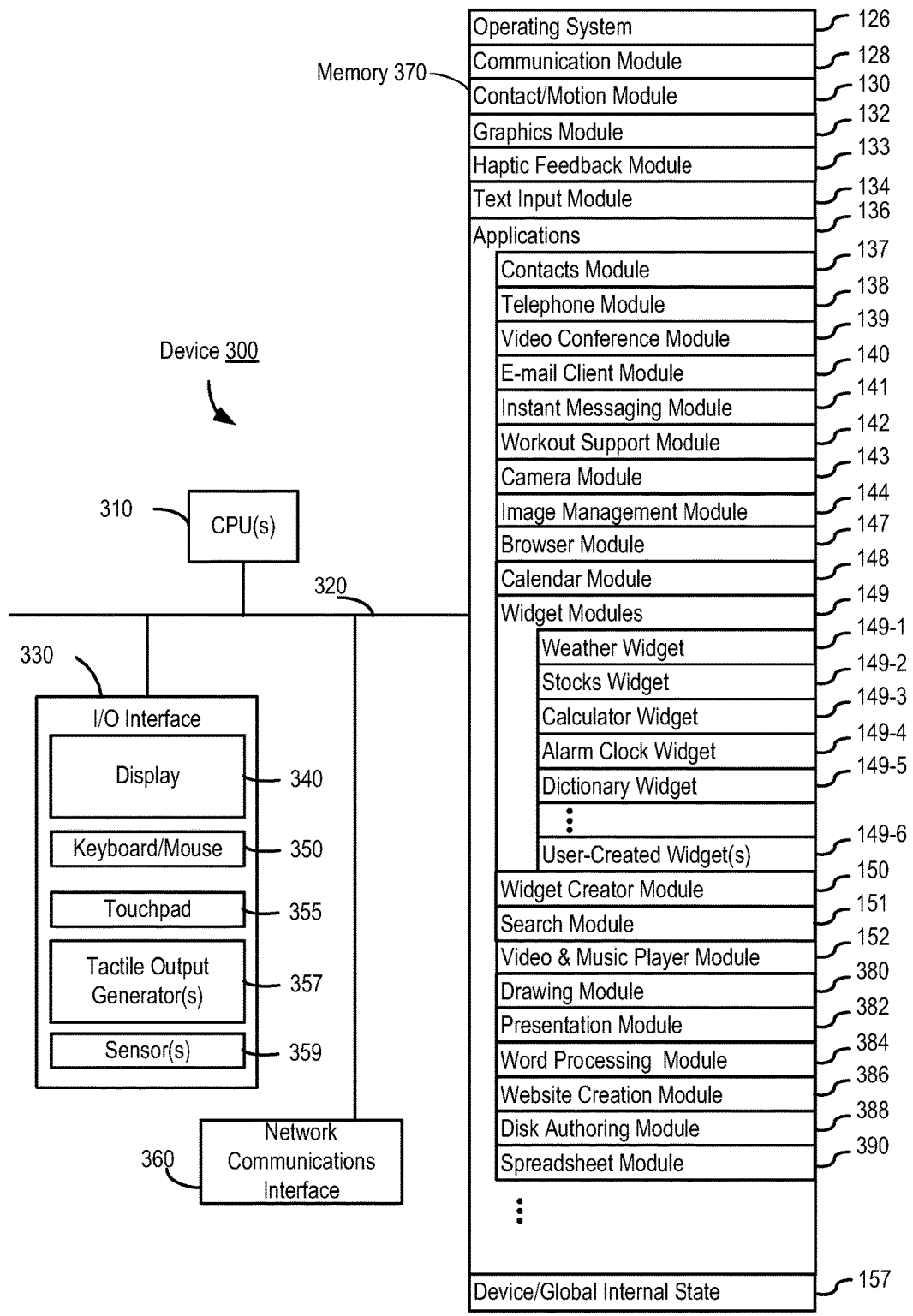
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
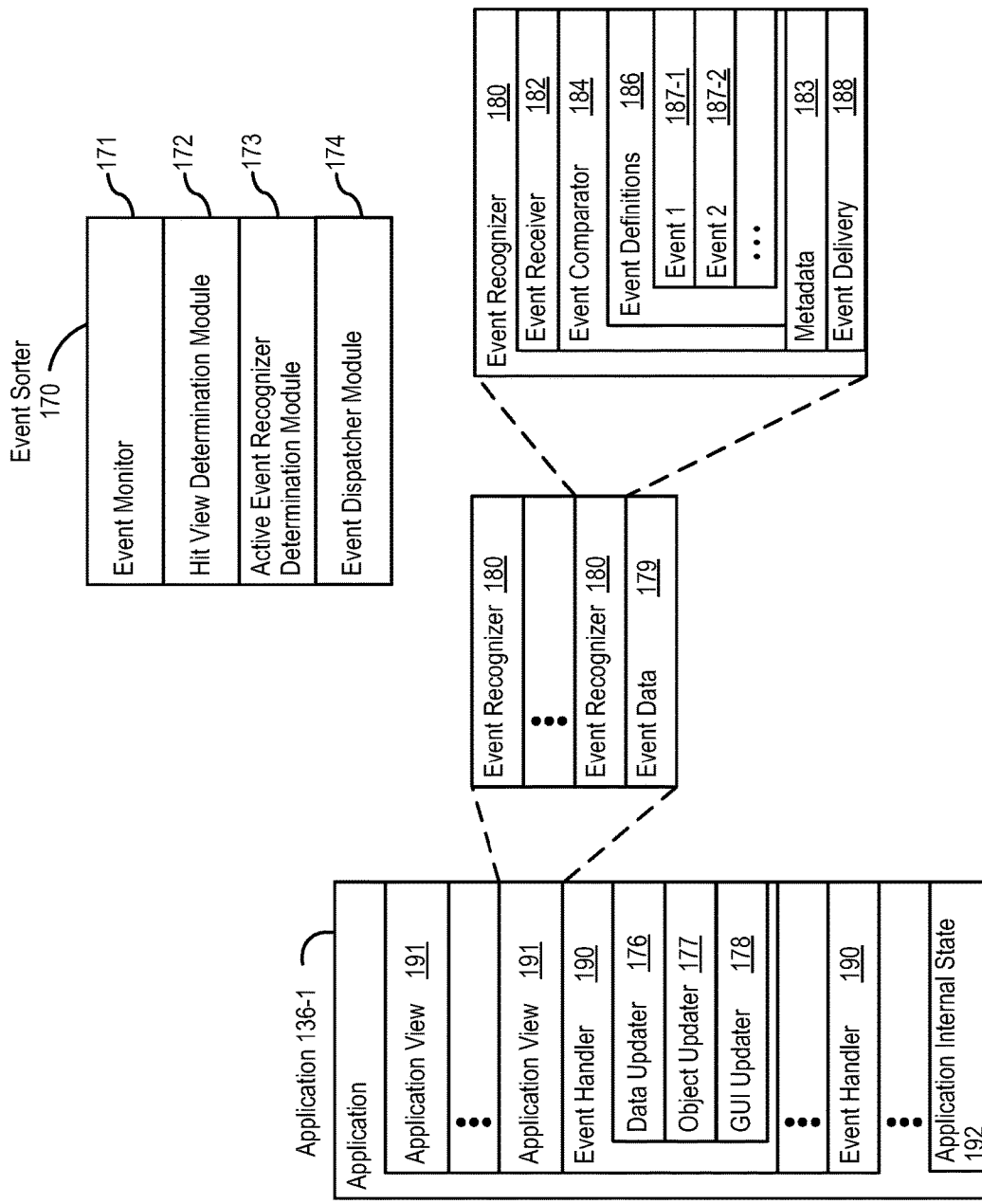
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
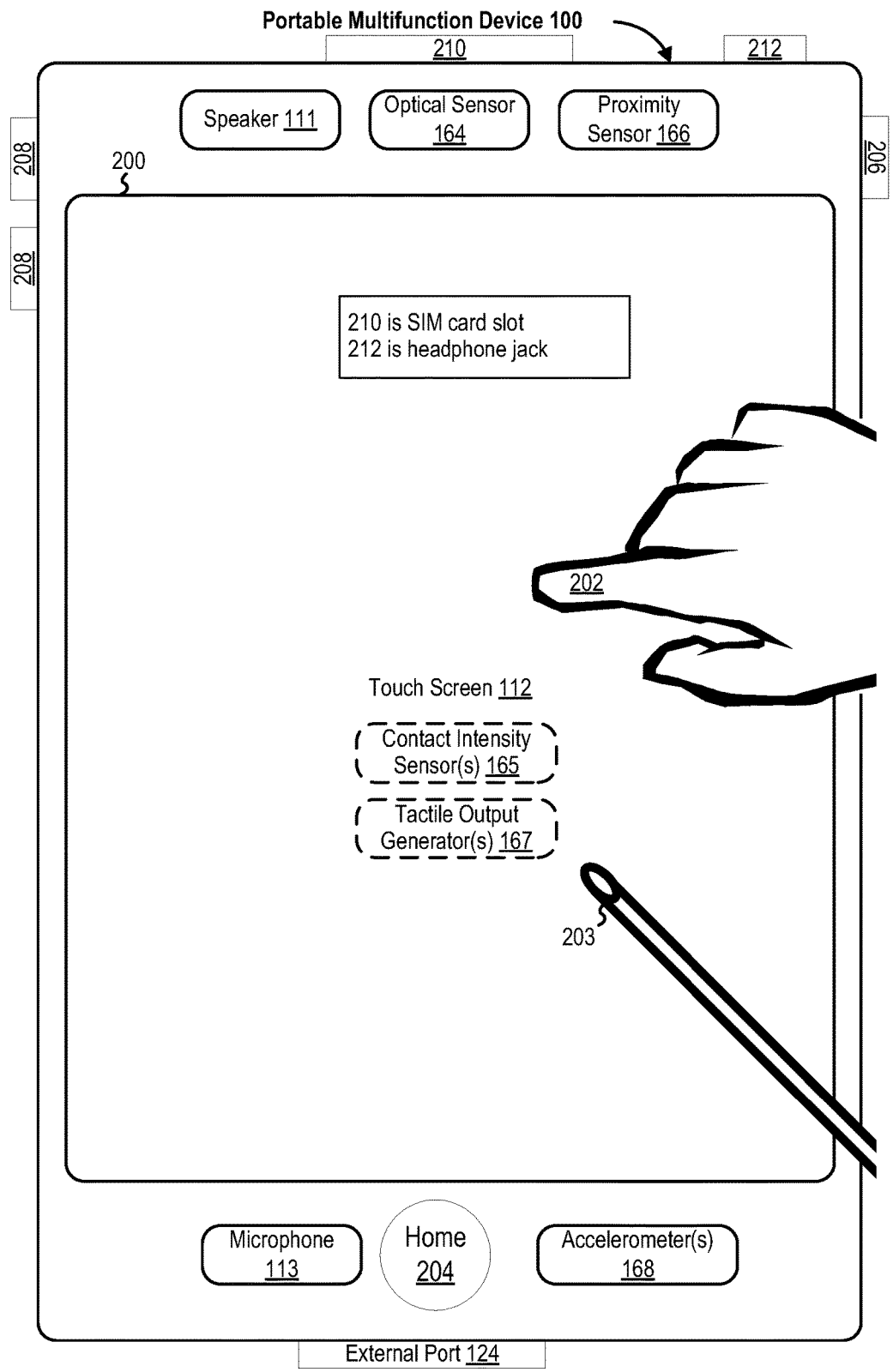
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
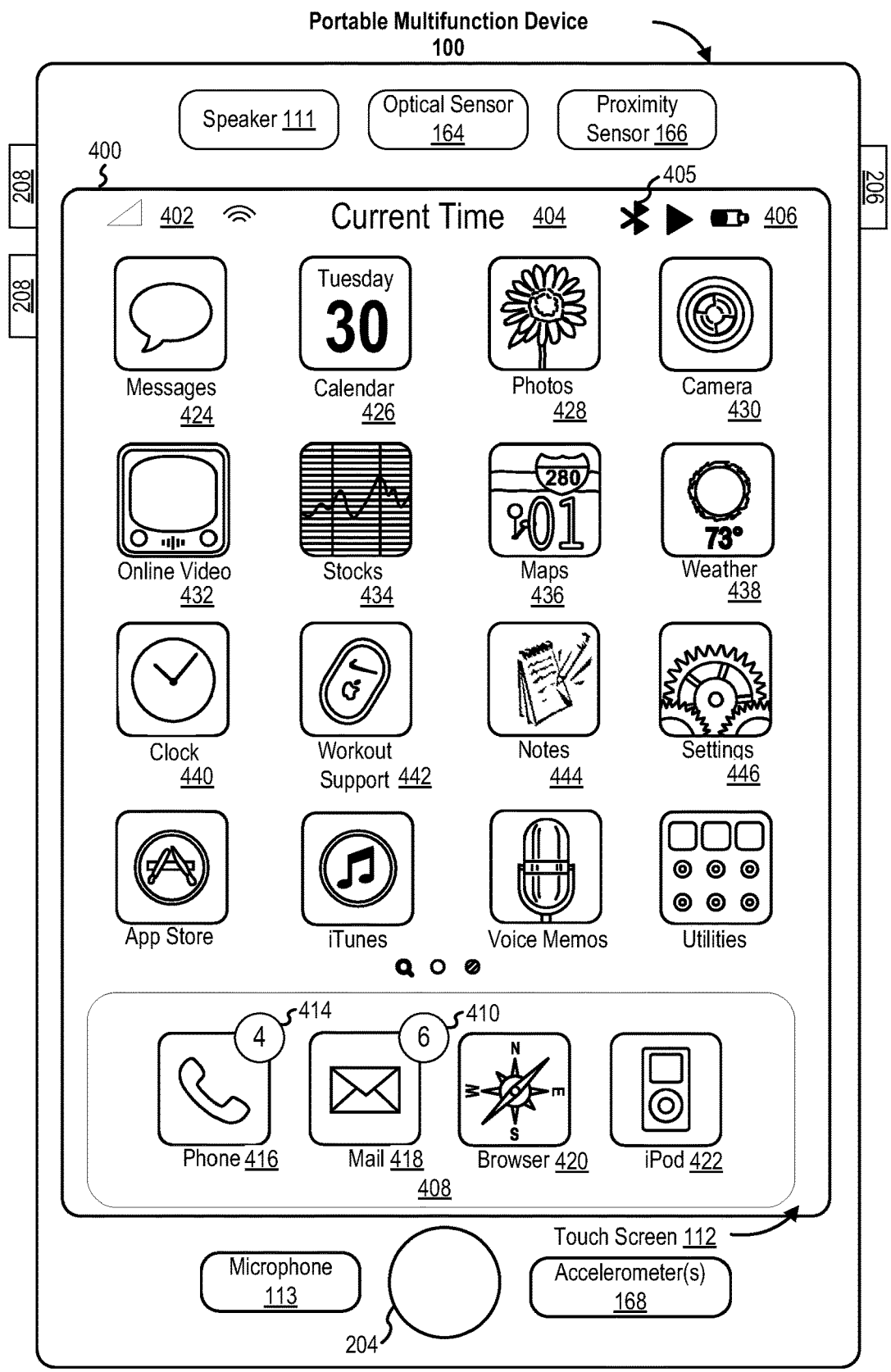
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
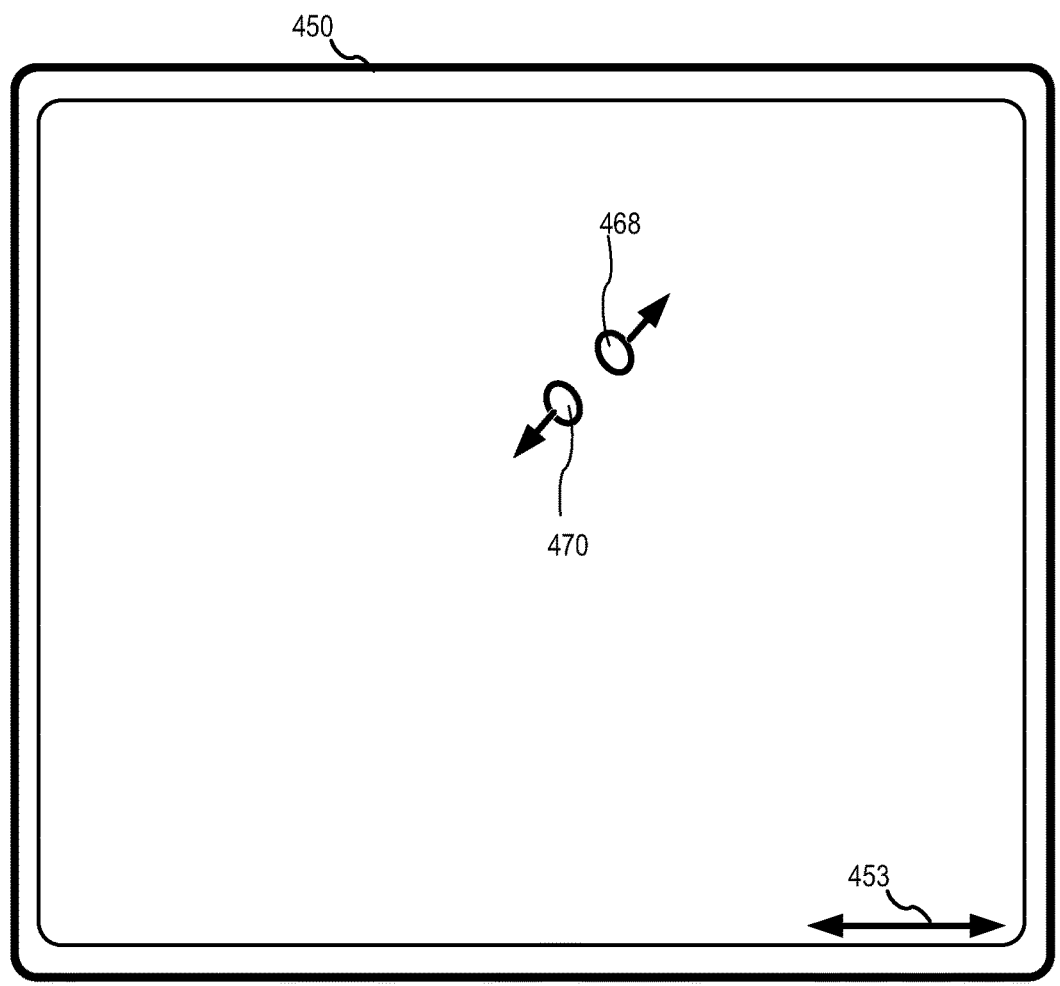
FIG. 4B illustrates an exemplary user interface for a multifunction device with a touch-sensitive surface that is separate from the display in accordance with some embodiments.
Figure 4B:
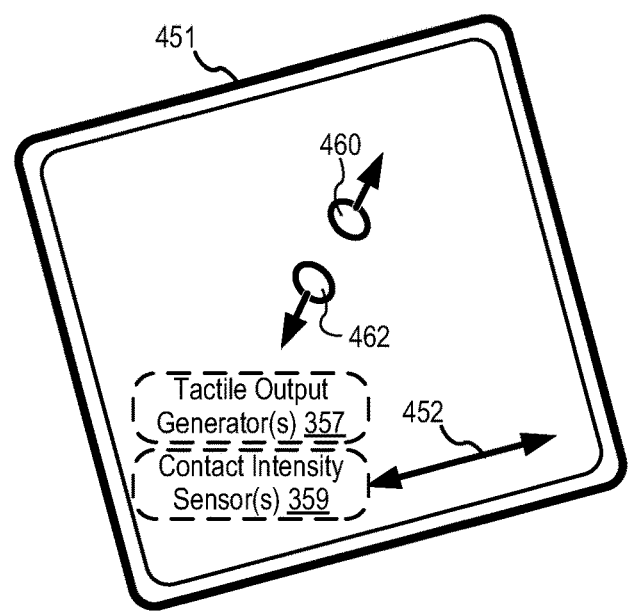

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
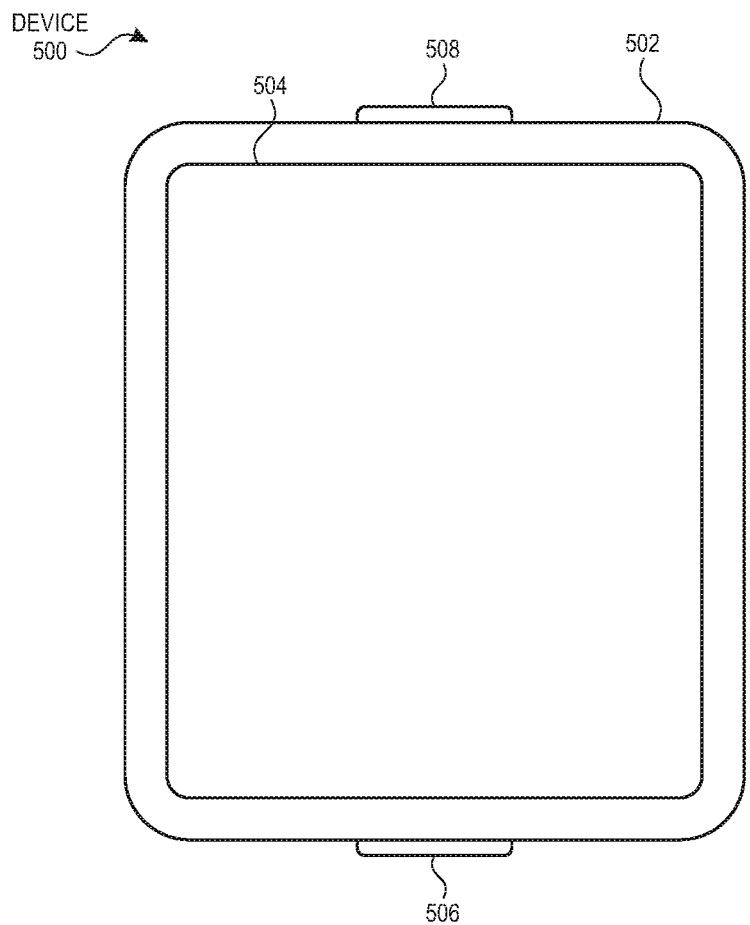
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
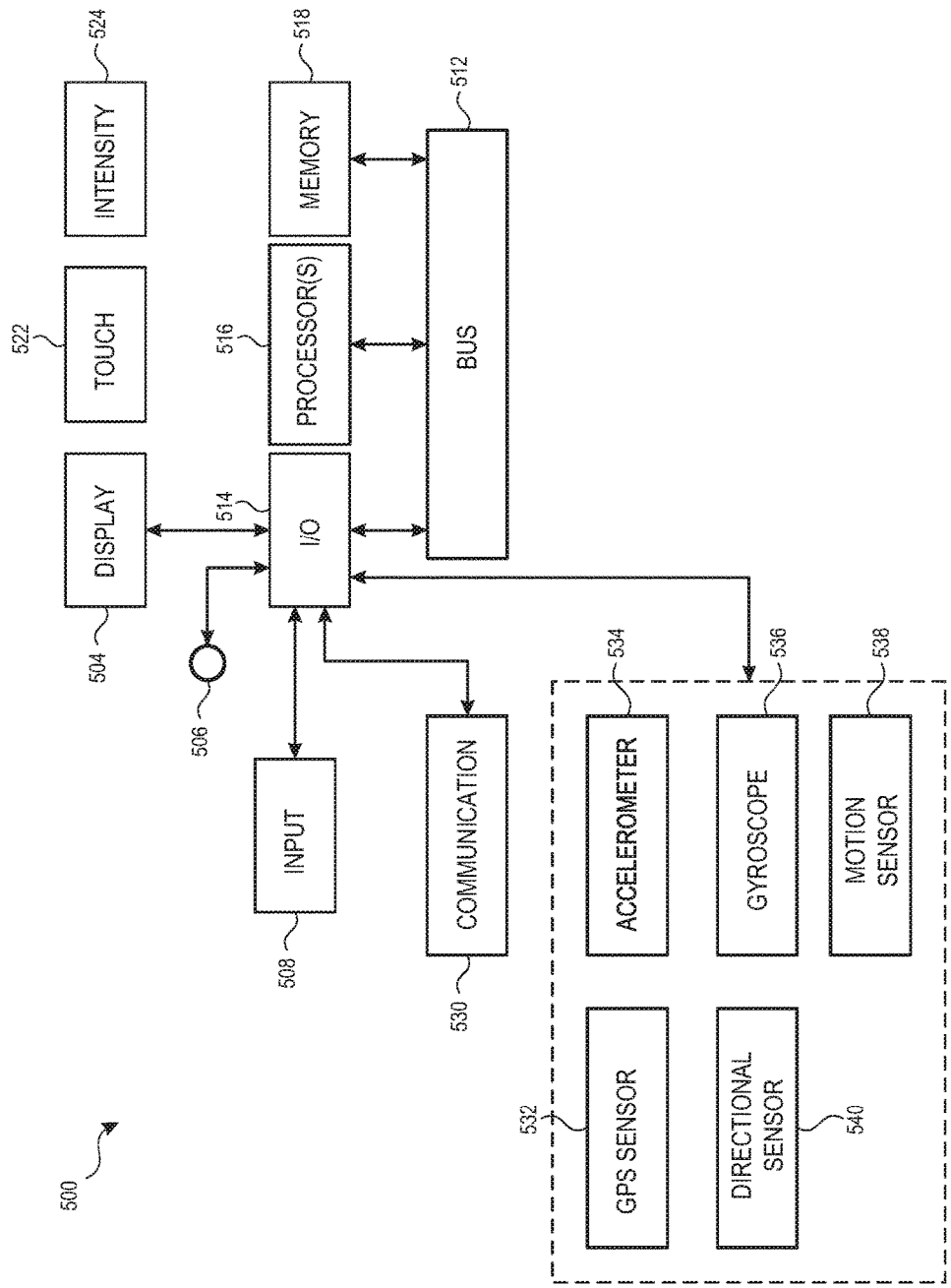
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including the processes described below. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 6:
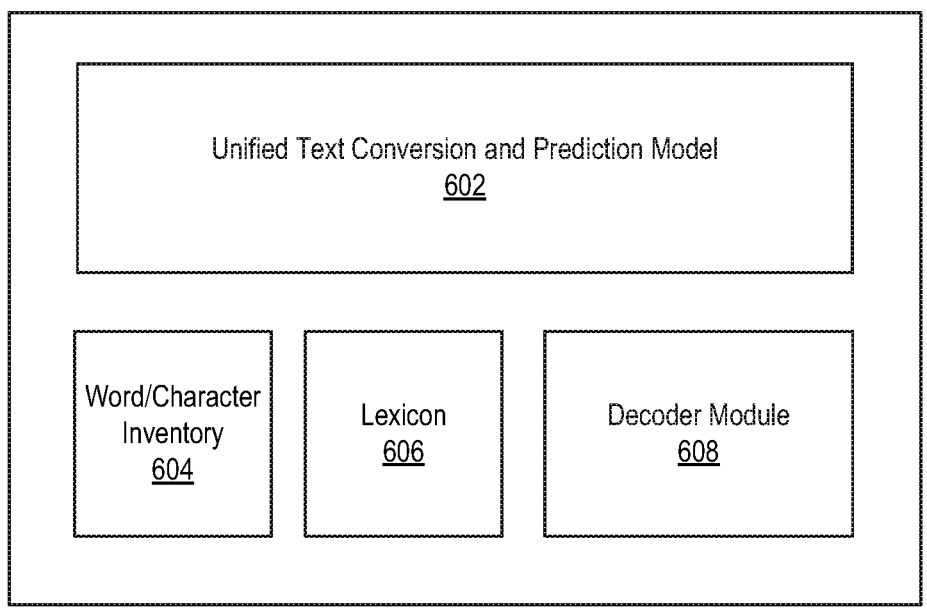
FIG. 6 illustrates an exemplary block diagram of a text conversion and prediction module in accordance with some embodiments.

FIG. 6 illustrates an exemplary schematic block diagram of text conversion and prediction module 600 in accordance with some embodiments. In some embodiments, text conversion and prediction module 600 is implemented using one or more multifunction devices including but not limited to devices 100 and 300 (FIGS. 1A and 3). In some examples, memory 102 (FIG. 1A) or 370 (FIG. 3) includes text conversion and prediction module 600. Text conversion and prediction module 600 is configured to perform text conversion and prediction functionalities. Specifically, text conversion and prediction module 600 is configured to perform processes for unified text conversion and prediction (e.g., process 800) as described herein. It should be recognized that text conversion and prediction module 600 need not be implemented as a separate software program, procedure, or module, and thus, various subsets of the module are, optionally, combined or otherwise rearranged in various embodiments.

As shown in FIG. 6, text conversion and prediction module 600 includes unified text conversion and prediction model 602, word/character inventory 604, lexicon 606, and decoder module 608. In operation, text conversion and prediction module 600 receives a character input sequence representing characters of a first writing system, and provides one or more candidate text outputs in a second writing system. Each candidate text output corresponds to the character input sequence. In addition, each candidate text output includes one or more predicted words in the second writing system.

Unified text conversion and prediction model 602 includes one or more models implementing a unified framework for text conversion and prediction. In some examples, the one or more models are implemented using a neural network architecture (e.g., recurrent neural network or long short-term memory network). Unified text conversion and prediction model 602 includes, for example, network 700 described below. In operation, the one or more models of unified text conversion and prediction model 602 receive a current character input of the character input sequence in the first writing system, and predicts one or more corresponding current words and/or next words in the second writing system given the previous characters in the character input sequence. In some examples, unified text conversion and prediction model 602 utilizes word/character inventory 604 and lexicon 606 to predict the current words and/or next words in the second writing system.

Word/character inventory 604 includes one or more word inventories and/or one or more character inventories. For example, word/character inventory 604 includes a word inventory having a predefined inventory of N words in the second writing system (e.g., a predefined inventory of N Chinese words), where N is an integer greater than zero. In some examples, word/character inventory 604 includes a first character inventory having a predefined inventory of J characters in the first writing system (e.g., a predefined inventory of J Latin characters), where J is an integer greater than zero. In some examples, word/character inventory 604 includes a second character inventory having a predefined inventory of M characters in the second writing system (e.g., predefined inventory of M Chinese Hanzi characters), where M is an integer greater than zero.

Lexicon 606 includes one or more lexicons. For example, a first lexicon of lexicon 606 includes a vocabulary of M characters in the second writing system (e.g., a vocabulary of M Chinese Hanzi characters). In some examples, each character of the first lexicon is mapped to a corresponding syllable of the first writing system (e.g., Pinyin syllable). In some examples, lexicon 606 is configured to determine one or more corresponding characters in the second writing system given a current character of the first writing system. For example, given the Pinyin character "g," the first lexicon can be used to map this Pinyin character to a corresponding Pinyin syllable "guo." The first lexicon can then map the Pinyin syllable "guo" to a corresponding Chinese Hanzi character "国." In some examples, lexicon 606 includes a second lexicon. The second lexicon includes a vocabulary of N words in the second writing system (e.g., a vocabulary of N Chinese words). In some examples, the second lexicon of lexicon 606 is configured to determine one or more corresponding words in the second writing system given a current character of the second writing system. For example, given the Chinese Hanzi character "国," the second lexicon can map this Chinese Hanzi character to a corresponding Chinese word "中国" (China).

Figure 7A:
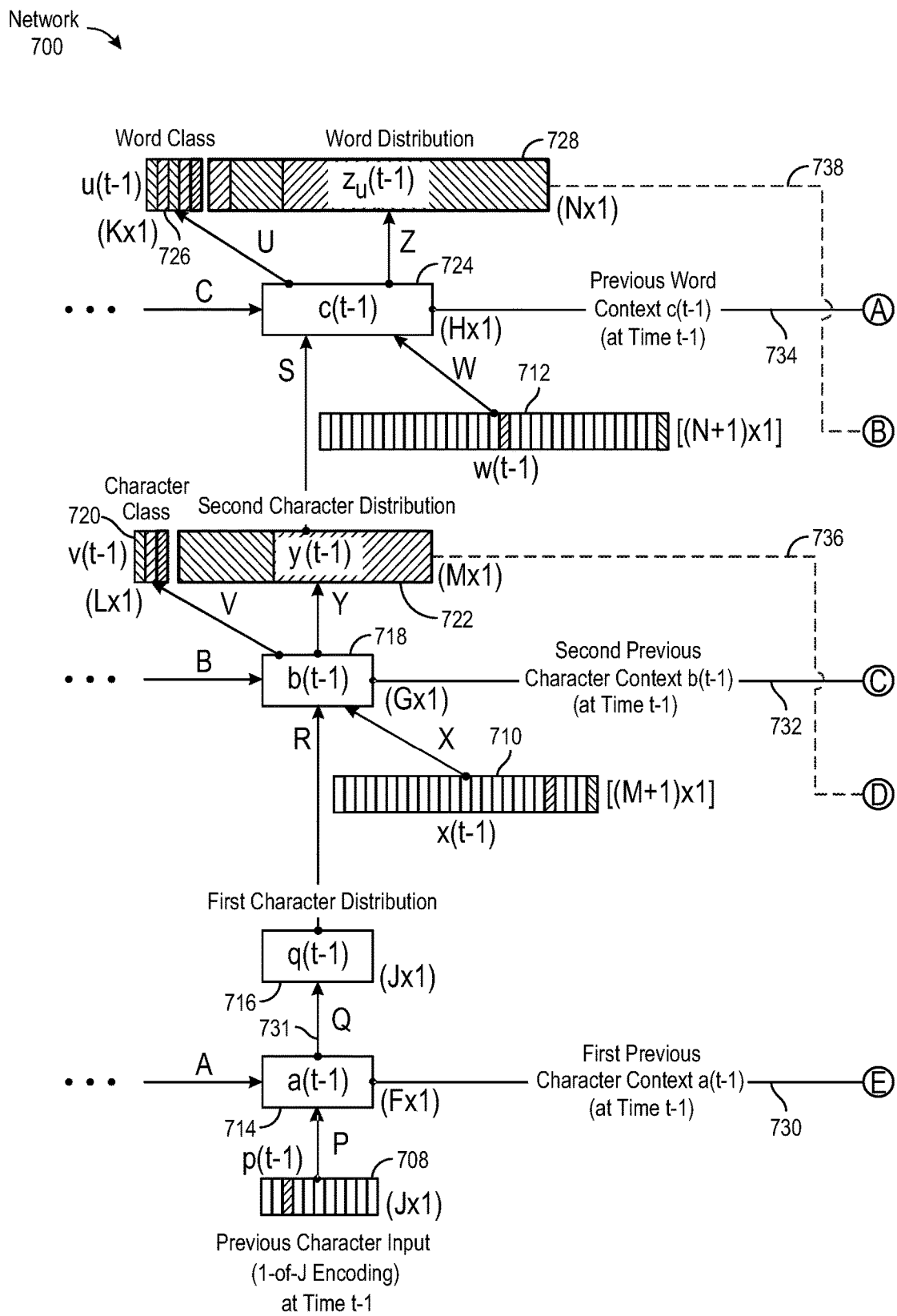
FIGS. 7A-7B illustrate a network implementing a unified framework for text conversion and prediction in accordance with some embodiments.
Figure 7B:
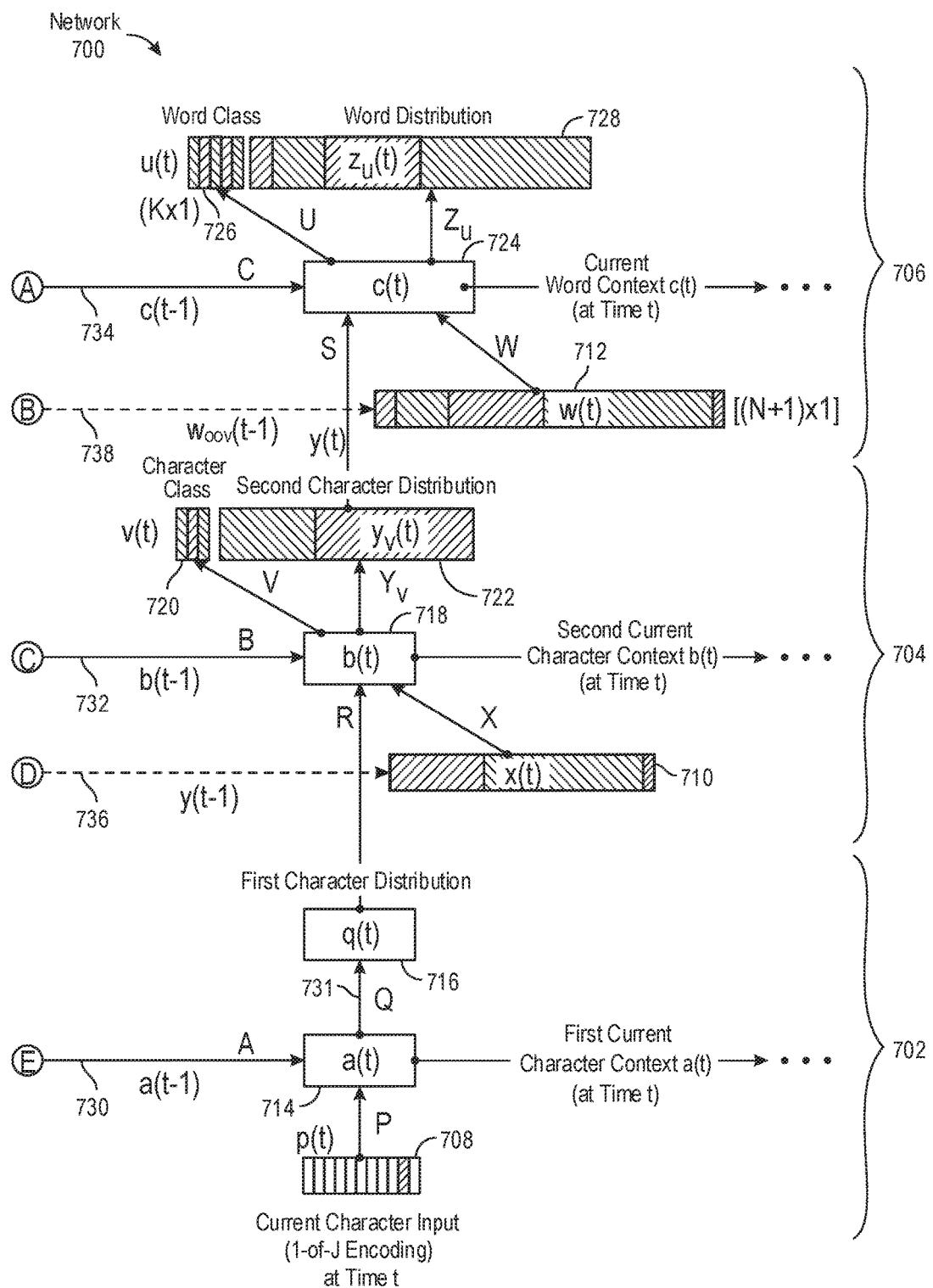
Figure 8A:
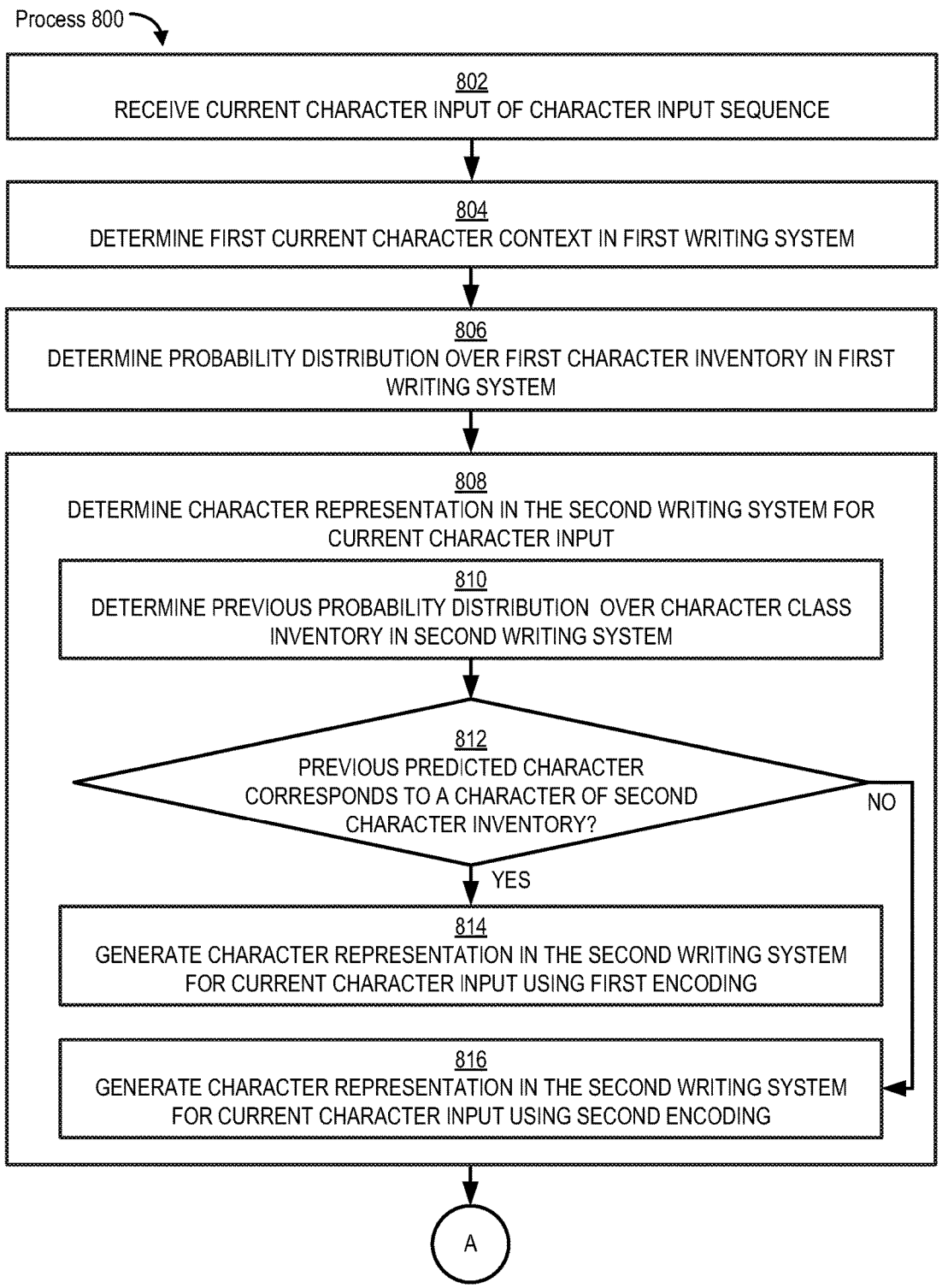
FIGS. 8A-8D illustrate a flow diagram of an exemplary process for unified text conversion and prediction in accordance with some embodiments.
Figure 8B:
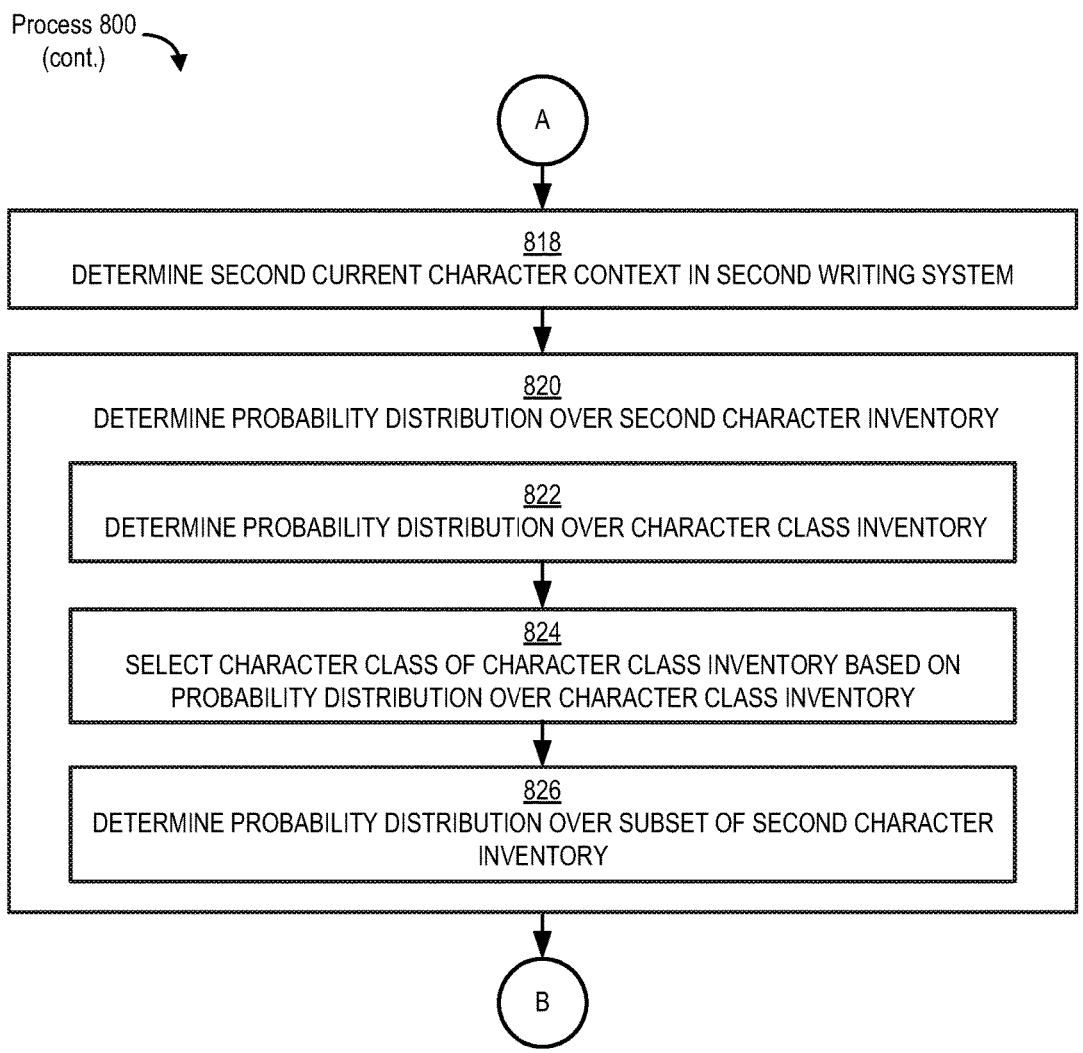
Figure 8C:
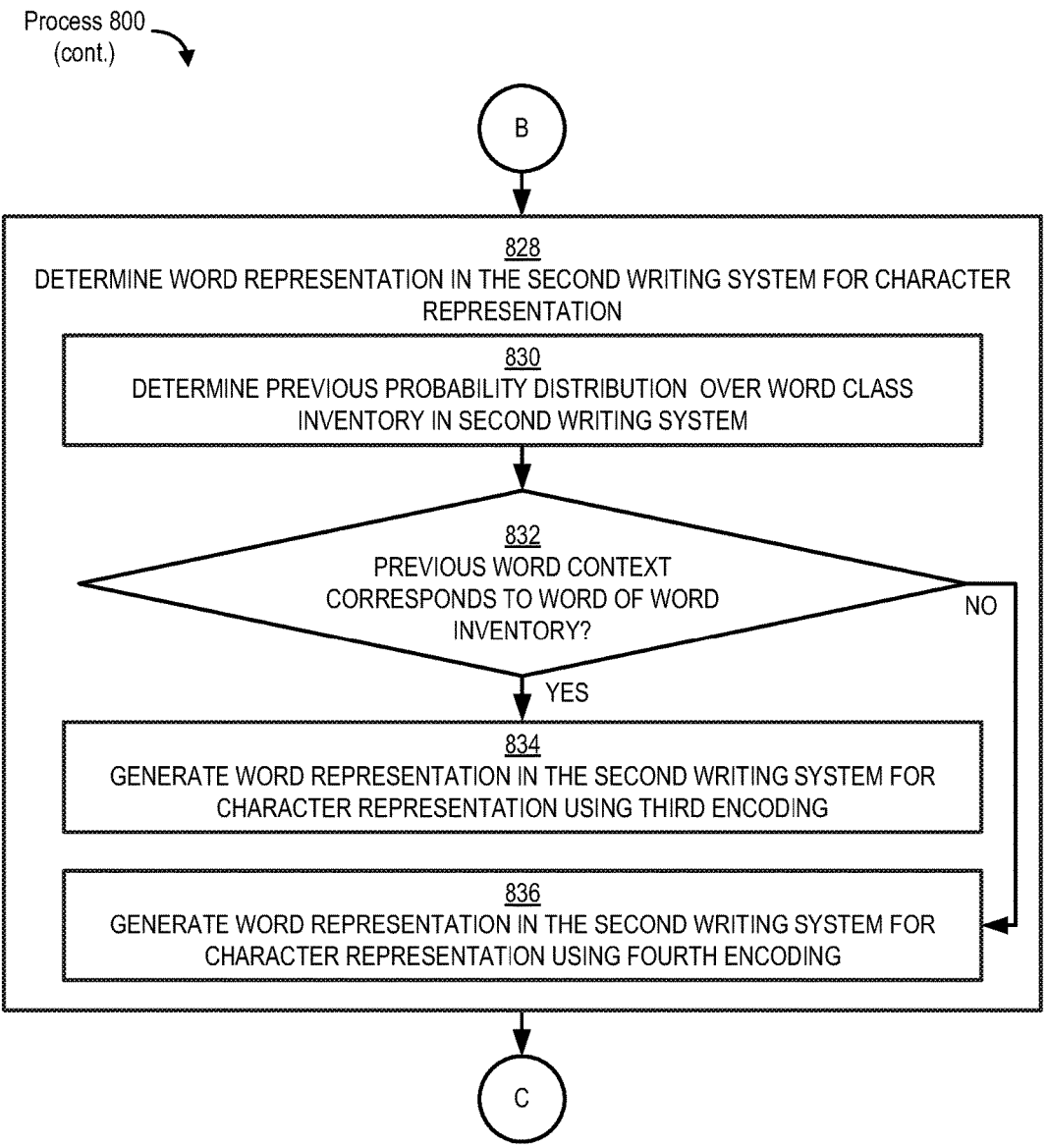
Figure 8D:
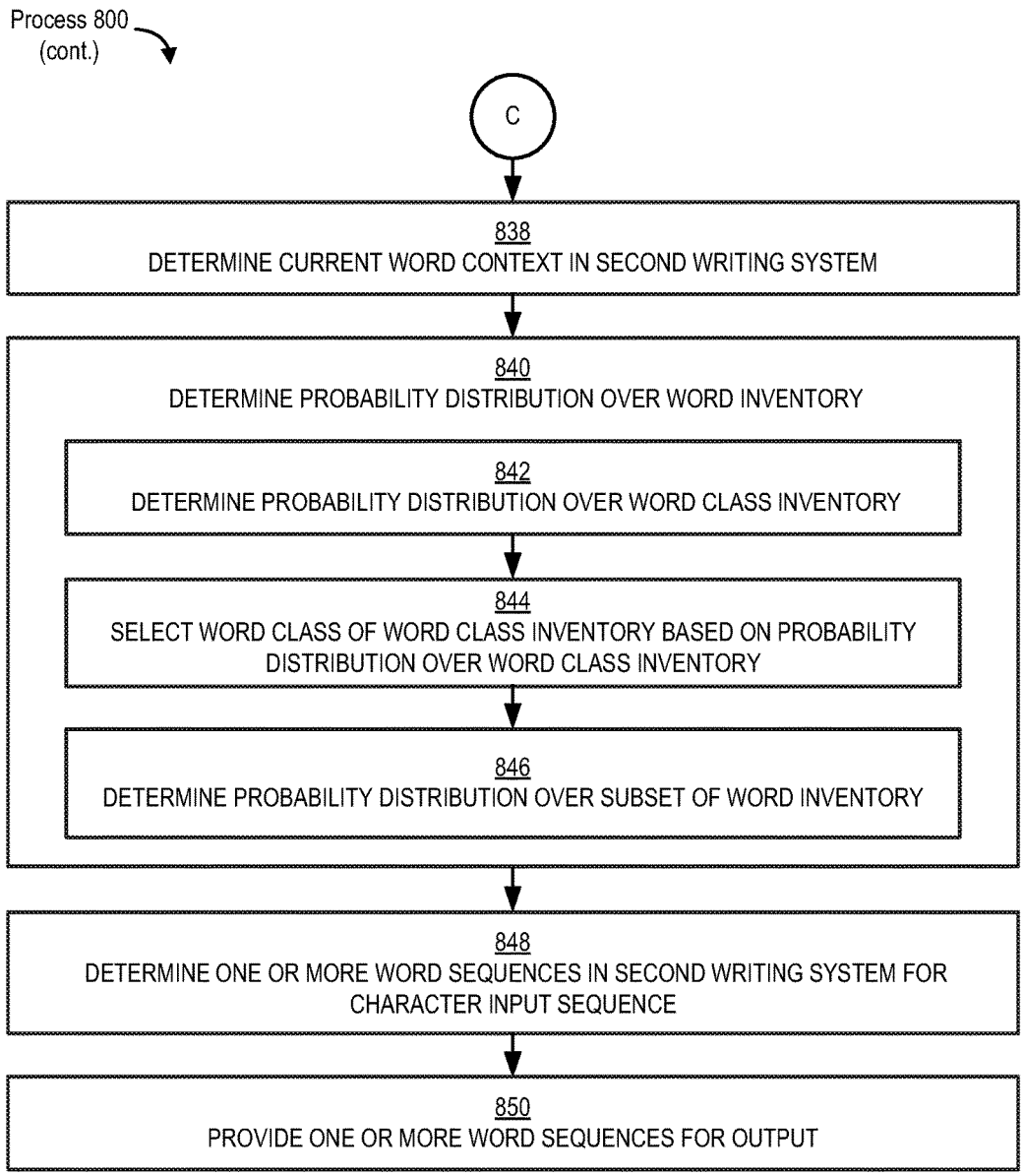

FIGS. 7A-7B illustrate exemplary network 700 for unified text conversion and prediction in accordance with some embodiments. Specifically, network 700 is an unfolded representation across two time steps: t−1 and t. FIG. 7A represents network 700 processing previous character input p(t−1) received at time step t−1 and FIG. 7B represents network 700 processing current character input p(t) received at time step t. Network 700 is, for example, a neural network (e.g., recurrent neural network) that can serve to convert text input of a first writing system (e.g., Chinese Pinyin input) to a second writing system (e.g., Chinese Hanzi words), and predict words in the second writing system that correspond to the text input. Network 700 can be implemented using one or more multifunction devices including but not limited to devices 100, 300, and 500 (FIGS. 1, 3, and 5A). In some examples, network 700 is an exemplary model of unified text conversion and prediction model 602, described above.

As shown, network 700 is a single continuous recurrent neural network that includes a cascade of three sub-networks, which include first character-level sub-network 702 for predicting characters of the first writing system, second character-level sub-network 704 for predicting characters of the second writing system, and word-level sub-network 706 for predicting words of the second writing system. By cascading the three sub-networks into a single end-to-end neural network, text conversion and prediction functionalities are better integrated, where the results of text conversion better inform the process of text prediction, and vice versa. For example, in network 700, text conversion is informed by word level context and text prediction is informed by a comprehensive inventory of candidate characters. This can improve the accuracy and efficiency of text conversion and prediction.

Network 700 includes multiple layers. Network 700, for instance, includes an input layer, one or more hidden layers, and an output layer. In this example, network 700 includes five hidden layers. It will be appreciated, however, that in other examples, network 700 can include one or more additional hidden layers. Each layer of network 700 includes any number of units. A layer includes, for instance, a single unit or multiple units. These units, which in some examples are referred to as dimensions, neurons, or nodes (e.g., context nodes), operate as the computational elements of network 700. As illustrated, the input layer includes first character input unit 708, second character input unit 710, and word input unit 712. The hidden layers include first character context unit 714, first character distribution unit 716, second character context unit 718, second character class distribution unit 720, second character distribution unit 722, and word context unit 724. The output layer includes word class distribution unit 726 and word distribution unit 728. The units of network 700 are interconnected using connections (e.g., connection 731 between first character context unit 714 and first character distribution unit 716). Each connection is unidirectional or bidirectional, and is further associated with a respective weight value. Each weight value specifies a strength of the corresponding connection and accordingly the relative influence of the value provided via the connection. Some units of network 700 are further interconnected using recurrent connections (e.g., recurrent connections 730, 732, and 734), which form a directed cycle such that the output from a unit at a previous time step is provided as the input of the same unit at the current time step. Although in the present example, the hidden layers of network 700 are depicted with an exemplary configuration, it should be recognized that, in other examples, the configuration of the units in the hidden layer can vary. For example, in some examples, each of the units of the hidden layers can be implemented as recurrent units (e.g., long short-term memory units) in order to avoid a vanishing gradient problem.

In operation, first character-level sub-network 702 receives a current character input of a character input sequence in the first writing system and determines a probability distribution over an inventory of characters in the first writing system. In particular, first character input unit 708 receives the current character input of the character input sequence at time step t. The character input sequence is received across a time period (e.g., from time step 1 to time step t) where each character input of the character input sequence is received at a respective time step. The character input sequence represents characters of a first writing system. For example, the character input sequence can represent the Pinyin input "zhong g," where the current character input of the character input sequence is the last Pinyin character "g" of the Pinyin input. The current character input received at time step t is represented by p(t), which is, for example, a vector or a spatial representation. The current character input p(t) is, for example, encoded using 1-of-J encoding. Accordingly, current character input p(t) has a dimension equal to J, where J is the size of the character inventory for the first writing system. For example, if the first writing system is Chinese Pinyin, J can be equal to 26, since there are 26 characters in the Latin alphabet.

First character context unit 714 receives the current character input p(t) from first character input unit 708 via the connection interconnecting first character input unit 708 and first character context unit 714. First character context unit 714 also receives, via recurrent connection 730, the first previous character context a(t−1). The first previous character context a(t−1) is the internal representation of context that is output from first character context unit 714 at the previous time step t−1 (FIG. 7A). In particular, the first previous character context a(t−1) is a vector representation of the portion of the character input sequence received prior to time step t. For example, if the character input sequence is the Pinyin input "zhong g" where the last character "g" is the current character input, then the first previous character context a(t−1) would represent the portion "zhong" that was received at first character input unit 708 prior to time step t (e.g., from time step 1 to time step t−1). The first previous character context a(t−1) has a dimension of F in some examples.

First character context unit 714 determines the first current character context a(t) in the first writing system based on the received current character input p(t) and the first previous character context a(t−1). As described, in some examples, connections between the units of network 700 may be weighted. In this example, the connection between first character input unit 708 and first character context unit 714 is weighted by a weight factor (e.g., weight matrix) P and recurrent connection 730 is weighted by a weight factor A. Weight factors P and A are, for example, F×J and F×F dimension matrices, respectively. For example, as shown below, first character context unit 714 determines the first current character context a(t) in accordance with equation (1):

$$a(t)=F\{P \cdot p(t)+A \cdot a(t-1)\} \quad (1)$$

where F{ } denotes a function (e.g., activation function), such as a sigmoid function, a hyperbolic tangent function, a rectified linear unit function, any function related thereto, or any combination thereof. The first current character context a(t) is provided, for example, as a vector of dimension F. In some examples, the first current character context a(t) is a character-level feature representation of the current character in the first writing system given the first previous character context a(t−1) and the current character input p(t).

First character distribution unit 716 receives the first current character context a(t) from first character context unit 714 via the connection between the first character context unit 714 and the first character distribution unit 716. Based on the received first current character context a(t), first character distribution unit 716 determines the probability distribution q(t) over a first character inventory. In some examples, the first current character context a(t) is provided to first character distribution unit 716 using a connection weighted by weight factor Q. For example, as shown below, first character distribution unit 716 determines the probability distribution q(t) over the first character inventory in accordance with equation (2):

$$q(t)=G\{Q \cdot a(t)\} \quad (2)$$

where G{ } denotes a function, such as a softmax activation function or an identity function. The probability distribution q(t) over the first character inventory includes probability values for each character in the first character inventory given the first current character context a(t). The first character inventory is an inventory of J characters in the first writing system. The probability distribution q(t) over the first character inventory thus has a dimension of J. In examples where the first writing system is Pinyin, the first character inventory includes each of the letters of the Latin alphabet (J=26).

Second character-level sub-network 704 receives the probability distribution q(t) over the first character inventory from first character-level sub-network 702 and determines a probability distribution over an inventory of characters in the second writing system. In particular, first character distribution unit 716 provides the probability distribution q(t) over the first character inventory to second character context unit 718 via the connection between first character distribution unit 716 and second character context unit 718. In some examples, the probability distribution q(t) over the first character inventory is not pruned prior to being provided to second character context unit 718. In other words, the entire probability distribution q(t) over the first character inventory is provided to second character context unit 718 and used to determine the second current character context b(t) in the second writing system. This can enable all possible candidates to be considered during text conversion and prediction, which results in a more accurate and robust text conversion and prediction solution.

Second character context unit 718 also receives, via recurrent connection 732, the second previous character context b(t−1) in the second writing system. The second previous character context b(t−1) is the internal representation of context that is output from second character context unit 718 at the previous time step t−1. In particular, the second previous character context b(t−1) is a vector representation of the character sequence in the second writing system that corresponds to the portion of the character input sequence in the first writing system received prior to time step t. For example, if the character input sequence is the Pinyin input "zhong g" where the last character "g" is the current character input, then the second previous character context b(t−1) would represent the Hanzi character "中" corresponding to the portion "zhong" that was received at first character input unit 708 prior to time step t (e.g., from time step 1 to time step t−1). The second previous character context b(t−1) has a dimension of G in some examples.

Second character context unit 718 further receives a character representation x(t) in the second writing system for the current character input p(t) from second character input unit 710. Character representation x(t) is a representation of the current character in the second writing system corresponding to the current character input p(t). In some examples, second character input unit 710 determines the character representation x(t) from the current character input p(t).

In some examples, the character representation x(t) is determined based on whether the current character represented by character representation x(t) is within a second character inventory ("in inventory") or outside the second character inventory ("out of inventory"). The second character inventory is, for example, an inventory of M characters in the second writing system. In examples where the second writing system is Chinese Hanzi, the first character inventory includes M Hanzi characters. For example, the second character inventory includes all Hanzi characters in the GB2312 standard, where M≈7000. In some examples, the character representation x(t) has a dimension of M. In other examples, the character representation x(t) has a dimension of M+1, where the (M+1)$^{th}$ bit indicates whether the character represented by the character representation x(t) is "in inventory" or "out of inventory."

In some examples, a determination is made as to whether the current character in the second writing system is a character that is within the second character inventory. The determination is based, for example, on a previous probability distribution v(t−1) over a character class inventory that was determined by second character class distribution unit 720 at the previous time step t−1. The character class inventory is an inventory of L character classes in the second writing system. In some examples, one of the character classes in the character class inventory is an "unknown" character class that does not correspond to any subset of characters in the second character inventory. Each of the other character classes in the character class inventory corresponds to a respective subset of characters in the second character inventory. If the previous probability distribution v(t−1) over the character class inventory indicates that the most likely character class in the character class inventory is a character class other than the "unknown" character class, then it is determined that the current character in the second writing system is within the second character inventory ("in inventory"). In response to the determination that the current character in the second writing system is within the second character inventory, the character representation x(t) of the current character is generated using a first encoding. For example, the first encoding is a sparse encoding, such as a 1-of-M encoding or a 1-of-(M+1) encoding, where the (M+1)$^{th}$ bit indicates whether the current character is "in inventory" or "out of inventory."

In some examples, if it is determined that the current character in the second writing system is within the second character inventory, a first lexicon (e.g., lexicon 606) is used to determine the current character in the second writing system that corresponds to the current character input p(t). For example, if the current character input p(t) is the Pinyin character "g," a first lexicon can be used to determine that the Pinyin character "g" corresponds to the Pinyin syllable "guo" and thus the Hanzi character "国." In this example, the character representation x(t) in the second writing system for the current character input p(t) represents the Hanzi character "国."

Conversely, if the previous probability distribution v(t−1) over the character class inventory indicates that the most likely character class in the character class inventory is the "unknown" character class, then it is determined that the current character in the second writing system is not within the second character inventory ("out of inventory"). In response to the determination that the current character in the second writing system is not within the second character inventory, the character representation x(t) of the current character is generated using a second encoding. In particular, second character input unit 710 receives a previous probability distribution y(t−1) over the second character inventory from second character distribution unit 722, via connection 736. The previous probability distribution y(t−1) over the second character inventory is determined by second character distribution unit 722 at the previous time step t−1. The character representation x(t) includes the previous probability distribution y(t−1) over the second character inventory. In some examples, the second encoding is a dense encoding. For example, substantially all of the bits for x(t) can be encoded with information. In the present example depicted in FIG. 7B, the current character at second character input unit 710 is determined to be "out of inventory" and thus, character representation x(t) includes the previous probability distribution y(t−1) over the second character inventory from second character distribution unit 722.

Based on the received probability distribution q(t) over the first character inventory, the received second previous character context b(t−1), and the received character representation x(t), second character context unit 718 determines the second current character context b(t). In some examples, the connections between first character distribution unit 716 and second character context unit 718 and between second character input unit 710 and second character context unit 718 are weighted by weight factors (e.g., weight matrices) R and X, respectively. Further, recurrent connection 732 is weighted by a weight factor B. Weight factors R, X, and B are, for example, G×J, G×(M+1), and G×G dimension matrices, respectively. For example, as shown below, second character context unit 718 determines the first current character context b(t) in accordance with equation (3):

$$b(t)=F\{X\cdot x(t)+R\cdot q(t)+B\cdot b(t-1)\} \quad (3)$$

The second current character context b(t) is a vector of dimension G in some examples. In some examples, the second current character context b(t) is a character-level feature representation of the current character in the second writing system given the probability distribution q(t) over the first character inventory, the second previous character context b(t−1), and the character representation x(t).

Second character context unit 718 is connected to second character class distribution unit 720 and second character distribution unit 722, and provides the determined second current character context b(t) to second character class distribution unit 720 and second character distribution unit 722 via their respective connections. Based on the second current character context b(t), second character class distribution unit 720 determines the probability distribution v(t) over the character class inventory. As described above, the character class inventory is an inventory of L character classes in the second writing system. The probability distribution v(t) over the character class inventory thus has a dimension of L, where L is significantly lower than M (e.g., lower by at least a factor of 10). In some examples, the connection between second character context unit 718 and second character class distribution unit 720 is weighted by weight factor V. As shown below, second character class distribution unit 720 determines the probability distribution v(t) over the character class inventory in accordance with equation (4):

$$v(t)=G\{V\cdot b(t)\} \quad (4)$$

In some examples, the probability distribution v(t) over the character class inventory includes probability values for each character class in the character class inventory given the second current character context b(t). As discussed above, the character class inventory includes, in some examples, an "unknown" character class that does not correspond to any portion of the second character inventory. Each character class other than the "unknown" character class corresponds to a respective subset of the second character inventory. Thus, each character class other than the "unknown" character class represents a category of characters having similar characteristics (e.g., phonetic, semantic, syntactic, morphologic, frequency of use, or any combination thereof).

If, based on the probability distribution v(t) over the character class inventory, the most-likely character class (e.g., the character class in the class inventory with the highest probability value) is determined to be a character class other than the "unknown" character class, second character distribution unit 722 determines the probability distribution Mt) over the respective subset of the second character inventory based on the second current character context b(t). The respective subset of the second character inventory corresponds to the most-likely character class. As discussed above, the second character inventory is, for example, an inventory of M characters in the second writing system. The respective subset of the second character inventory would thus include only a portion $M_v$ of the M characters, where $M_v$ is less than M. In the present example, the connection between second character context unit 718 and second character distribution unit 722 weights the second current character context b(t) with weight factor $Y_v$. Therefore, as shown below, second character distribution unit 722 determines the probability distribution $y_v(t)$ over the respective subset of the second character inventory in accordance with equation (5):

$$y_v(t)=G\{Y_v\cdot b(t)\} \quad (5)$$

In some examples, second character distribution unit 722 further determines the probability distribution y(t) over the entire second character inventory based on the product of probability distribution v(t) over the character class inventory and the probability distribution $y_v(t)$ over the respective subset of the second character inventory. For example, as shown below, the second character distribution unit 722 further determines the probability distribution y(t) over the entire second character inventory in accordance with equation 6:

$$y(t)=v(t)\cdot y_v(t) \quad (6)$$

In other examples, if, based on the probability distribution v(t) over the character class inventory, the most-likely character class is determined to be the "unknown" character class, second character distribution unit 722 directly determines the probability distribution y(t) over the entire second character inventory based on the second current character context b(t). In these examples, the connection between second character context unit 718 and second character distribution unit 722 weights the second current character context b(t) with weight factor Y. Therefore, as shown below, second character distribution unit 722 determines the probability distribution y(t) over the entire second character inventory in accordance with equation (7):

$$y(t)=G\{Y\cdot b(t)\} \quad (7)$$

The probability distribution y(t) over the second character inventory includes probability values for each character in the second character inventory given the second current character context b(t). The probability distribution y(t) over the second character inventory has a dimension of M in some examples.

Word-level sub-network 706 receives the probability distribution y(t) over the second character inventory from second character-level sub-network 704, and determines a probability distribution over an inventory of words in the second writing system. In particular, second character distribution unit 722 provides the probability distribution y(t) over the second character inventory to word context unit 724 via the connection between second character distribution unit 722 and word context unit 724. In some examples, the probability distribution y(t) over the second character inventory is not pruned prior to being provided to word context unit 724. In other words, the entire probability distribution y(t) over the entire second character inventory is provided to word context unit 724 and used to determine the current word context c(t) in the second writing system. This can enable all possible candidates to be considered during word prediction, which results in a more accurate and robust text conversion and prediction solution.

Word context unit 724 also receives, via recurrent connection 734, the previous word context c(t−1) in the second writing system. The previous word context c(t−1) is the internal representation of context that is output from word context unit 724 at the previous time step t−1. In particular, the previous word context c(t−1) is a vector representation of the word sequence in the second writing system corresponding to the portion of the character input sequence in the first writing system received prior to time step t. For example, if the character input sequence is the Pinyin input "zhong g," where the last character "g" is the current character input, the previous word context c(t−1) would represent the Chinese word "中" (middle) corresponding to the portion "zhong" that was received at first character input unit 708 prior to time step t (e.g., from time step 1 to time step t−1). The previous word context c(t−1) has a dimension of H in some examples.

Word context unit 724 further receives a word representation w(t) in the second writing system for the character representation x(t) from word input unit 712. Word representation w(t) is a representation of the current word in the second writing system corresponding to the character representation x(t) and the current character input p(t). In some examples, word input unit 712 determined the word representation w(t) from the character representation x(t).

In some examples, the word representation w(t) is determined based on whether the current word represented by word representation w(t) is within a word inventory ("in inventory") or outside the word inventory ("out of inventory"). The word inventory is, for example, an inventory of N words in the second writing system. In examples where the second writing system is Chinese, the word inventory includes N Chinese words. In one example, N 30,000. In some examples, the word representation w(t) has a dimension of N. In other examples, the word representation w(t) has a dimension of N+1, where the (N+1)$^{th}$ bit indicates whether the current word represented by the word representation w(t) is "in inventory" or "out of inventory."

In some examples, a determination is made as to whether the current word is a word that is within the word inventory. The determination is, for example, based on a previous probability distribution u(t−1) over a word class inventory determined by word class distribution unit 726 at the previous time step t−1. The word class inventory is an inventory of K word classes in the second writing system. In some examples, one of the word classes in the word class inventory is an "unknown" word class that does not correspond to any subset of words in the word inventory. Each of the other word classes in the word class inventory corresponds to a respective subset of words in the word inventory. If the previous probability distribution u(t−1) over the word class inventory indicates that the most likely word class in the second character inventory is a word class other than the "unknown" word class, then it is determined that the current word is within the word inventory ("in inventory"). In response to the determination that the current word is within the word inventory, the word representation w(t) of the current word is generated using a third encoding. For example, the third encoding is a sparse encoding, such as a 1-of-N encoding or a 1-of-(N+1) encoding, where the (N+1)$^{th}$ bit indicates whether the current word is in inventory or out of inventory.

In some examples, if it is determined that the current word in the second writing system is within the word inventory, a second lexicon is used to determine the current word in the second writing system that corresponds to the character representation x(t) and the current character input p(t). For example, if the character represented by the character representation x(t) is the Hanzi character "国," a second lexicon can be used to determine that the Hanzi character "国" corresponds to the Chinese word "中国" (China). In this example, the word representation w(t) in the second writing system for the character representation x(t) represents the Chinese word "中国" (China).

Conversely, if the previous probability distribution u(t−1) over the word class inventory indicates that the most likely word class in the word class inventory is the "unknown" word class, then it is determined that the current word is not within the word inventory ("out of inventory"). In response to the determination that the current word is not within the word inventory, the word representation w(t) of the current word is generated using a fourth encoding. In particular, word input unit 712 receives a previous probability distribution z(t−1) over the word inventory from word distribution unit 728, via connection 738. The previous probability distribution z(t−1) over the word inventory is determined by word distribution unit 728 at the previous time step t−1. The word representation w(t) includes the previous probability distribution z(t−1) over the word inventory. In some examples, the fourth encoding is a dense encoding. For example, substantially all of the bits for w(t) can be encoded with information. In the present example depicted in FIG. 7B, the current word at word input unit 712 is determined to be "out of inventory" and thus word representation w(t) includes the previous probability distribution z(t−1) over the word inventory from word distribution unit 728.

Based on the received probability distribution y(t) over the second character inventory, the received previous word context c(t−1), and the received word representation w(t), word context unit 724 determines the current word context c(t). In some examples, the connections between second character distribution unit 722 and word context unit 724, and between word input unit 712 and word context unit 724 are weighted by weight factors (e.g., weight matrices) S and W, respectively. Further, recurrent connection 734 is weighted by a weight factor C. Weight factors S, W, and C are, for example, H×M, H×(N+1), and H×H dimension matrices, respectively. For example, as shown below, word context unit 724 determines the current word context c(t) in accordance with equation (8):

$$c(t)=F\{W \cdot w(t)+S \cdot y(t)+C \cdot c(t-1)\} \qquad (8)$$

The current word context c(t) is, for example, a vector of dimension H. In some examples, the current word context c(t) is a word-level feature representation of the current word in the second writing system given the probability distribution y(t) over the second character inventory, the previous word context c(t−1), and the word representation w(t).

Word context unit 724 is connected to word class distribution unit 726 and word distribution unit 728 and provides the current word context c(t) to word class distribution unit 726 and word distribution unit 728 via their respective connections. Based on the current word context c(t), word class distribution unit 726 determines the probability distribution u(t) over the word class inventory. As described above, the word class inventory is an inventory of K word classes in the second writing system. The probability distribution u(t) over the word class inventory thus has a dimension of K, where K is significantly lower than N (e.g., lower by at least a factor of 10). In some examples, the connection between word context unit 724 and word class distribution unit 726 is weighted by weight factor U. As shown below, word class distribution unit 726 determines the probability distribution u(t) over the word class inventory in accordance with equation (9):

$$u(t)=G\{U \cdot c(t)\} \quad (9)$$

In some examples, the probability distribution u(t) over the word class inventory includes probability values for each word class in the word class inventory given the current word context c(t). As discussed above, the word class inventory includes, in some examples, an "unknown" word class that does not correspond to any portion of the word inventory. Each word class other than the "unknown" word class corresponds to a respective subset of the word inventory. Thus, each word class other than the "unknown" word class represents a category of words having similar characteristics (e.g., phonetic, semantic, syntactic, morphologic, frequency of use, or any combination thereof).

If, based on the probability distribution u(t) over the word class inventory, the most-likely word class (e.g., the word class in the word inventory with the highest probability value) is determined to be a word class other than the "unknown" word class, word distribution unit 728 determines the probability distribution $z_u(t)$ over the respective subset of the word inventory based on the current word context c(t). The respective subset of the word inventory corresponds to the most-likely word class. As discussed above, the word inventory is, for example, an inventory of N words in the second writing system. The respective subset of the word inventory would thus include only a portion $N_u$ of the N words, where $N_u$ is less than N. In the present example, the connection between word context unit 724 and word distribution unit 728 weights the current word context c(t) with weight factor $Z_u$. Therefore, as shown below, word distribution unit 728 determines the probability distribution $z_u(t)$ over the respective subset of the word inventory in accordance with equation (10):

$$z_u(t)=G\{Z_u \cdot c(t)\} \quad (10)$$

In some examples, word distribution unit 728 further determines the probability distribution z(t) over the entire word inventory based on the product of probability distribution u(t) over the word class inventory and the probability distribution $z_u(t)$ over the respective subset of the word inventory. For example, as shown below, the word distribution unit 728 determines the probability distribution z(t) over the entire word inventory in accordance with equation (11):

$$z(t)=u(t) \cdot z_u(t) \quad (11)$$

In other examples, if, based on the probability distribution u(t) over the word class inventory, the most-likely word class is determined to be the "unknown" word class, word distribution unit 722 directly determines the probability distribution z(t) over the entire word inventory based on the current word context c(t). In these examples, the connection between word context unit 724 and word distribution unit 728 weights the current word context c(t) with weight factor Z. Therefore, as shown below, word distribution unit 728 determines the probability distribution z(t) over the entire word inventory in accordance with equation (12):

$$z(t)=G\{Z \cdot c(t)\} \quad (12)$$

The probability distribution z(t) over the word inventory includes probability values for each word in the word inventory given the current word context c(t). The probability distribution z(t) over the word inventory has a dimension of N in some examples.

It should be recognized that network 700, described above, only illustrates some embodiments for unified text conversion and prediction, and that various changes and modifications can be apparent to those skilled in the art. For instance, in some embodiments, first character-level sub-network 702 can be additionally or alternatively configured to predict syllables of the first writing system given a current character input (e.g., predict Pinyin syllables given a current Pinyin character input) using a similar network architecture to that described above. In some embodiments, the syllable prediction can be implemented as an additional sub-network integrated in network 700.

Referring back to FIG. 6, decoder module 608 receives predicted words in the second writing system for respective characters in the first writing system from unified text conversion and prediction model 602 (e.g., from network 700). In addition, decoder module 608 receives respective probability values for the predicted words (e.g., probability distribution z(t) over the word inventory). The probability values indicate the probability of the predicted words in the second writing system given the respective characters and the previous character context in the first writing system. Based on the predicted words and the probability values received from unified text conversion and prediction model 602, decoder module 608 determines candidate word sequences in the second writing system that correspond to the character input sequence in the first writing system. For example, decoder module 608 can arrange the predicted words in a lattice and perform a Viterbi search to determine the n-best (e.g., n most probable) candidate word sequences in the second writing system that correspond to the character input sequence in the first writing system, where n is a predetermined integer greater than zero. In some examples, the n-best candidate word sequences are provided as candidate text outputs from text conversion and prediction module 600.

Figure 9:
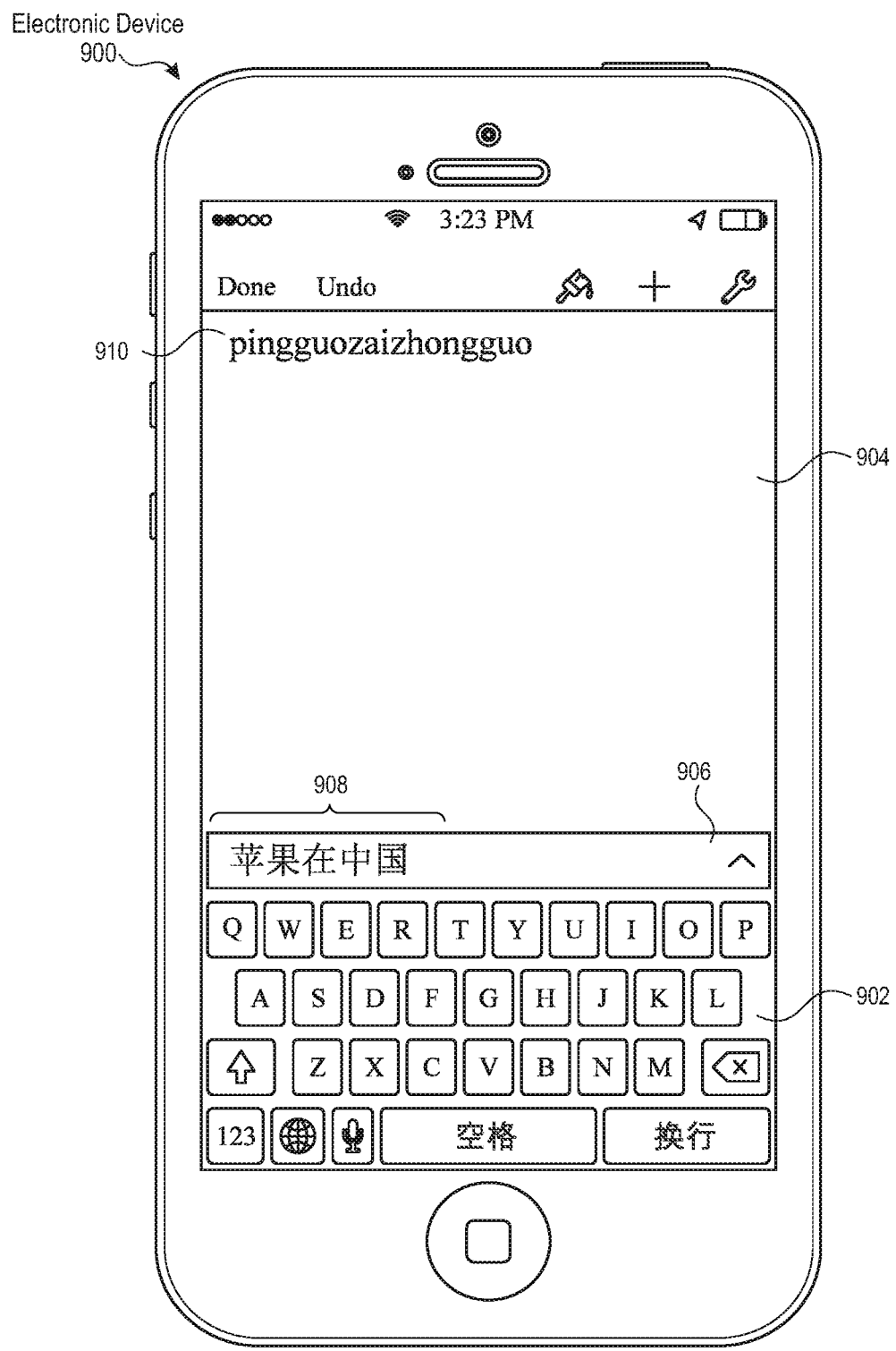
FIG. 9 illustrates an electronic device implementing aspects of unified text conversion and prediction in accordance with some embodiments.

In some examples, decoder module 608 provides the n-best candidate word sequences to text input module 134. Text input module 134 presents a keyboard and a text input interface for entering text. For example, as shown in FIG. 9, text input module 134 displays keyboard 902 and text input interface 906. A user provides character input sequence 910 of a first writing system (e.g., Pinyin) via keyboard 902, and character input sequence 910 is displayed on text field 904. Decoder module 608 (in conjunction with unified text conversion and prediction model 602, word/character inventory 604, and lexicon 606) determines n-best candidate word sequences in the second writing system (e.g., Chinese Hanzi) corresponding to character input sequence 910, and provides the n-best candidate word sequences to text input module 134 for display on text input interface 906. Specifically, as shown, candidate word sequence 908 in the second writing system is received from decoder module 608 and displayed on text input 906 for user selection. In some examples, upon user selection of candidate word sequence 908 (e.g., via keyboard 902 or text user interface 906), candidate word sequence 908 is displayed on text field 904.

FIGS. 8A-8D is a flow diagram illustrating process 800 for unified text conversion and prediction in accordance with some embodiments. Process 800 is performed, for example, using one or more electronic devices (e.g., device 100, 300, or 500) with a display. In particular, process 800 is performed, for example, using a unified text conversion and prediction model (e.g., network 700 of unified text conversion and prediction model 602) of a text conversion and prediction module (e.g., text conversion and prediction module 600) implemented on the one or more devices. Operations in process 800 are, optionally, combined and/or the order of some operations is, optionally, changed. Further, some operations in process 800 are, optionally, omitted.

In process 800, text input of a first writing system is converted to text of a second writing system and the current and/or next word of the second writing system is predicted in a unified framework. In some examples, process 800 is implemented for Chinese text input and prediction, where the first writing system comprises a Chinese phonetic notation, such as Chinese Pinyin or Chinese Zhuyin. In these examples, the second writing system comprises Chinese Hanzi (Chinese characters), which includes the traditional Chinese character system and/or the simplified Chinese character system. In other examples, process 800 is implemented for Japanese text input and prediction, where the first writing system comprises Japanese Kana or Japanese Romaji and the second symbolic system comprises a combination of Japanese Kana and Kanji. One skilled in the art should recognize that process 800 can be implemented for other suitable languages, where a phonetic text representation of the language is received in a first writing system (e.g., Roman or Latin alphabet) and subsequently converted to a second writing system of the language (e.g., Korean, Thai, writing systems of certain East Indian languages, Cyrillic, Greek, Russian, etc.).

At block 802, a current character input of a character input sequence is received. The character input sequence represents characters of a first writing system. In some examples, the character input sequence is received via a user interface (e.g., a keyboard/mouse 350, or a text input graphical user interface displayed on touch screen 112) of the electronic device. In some examples, the character input sequence is received at the input layer of a neural network (e.g., network 700) for text conversion and prediction. For example, the character input sequence is received at first character input unit 708 of network 700. The characters of the character input sequence are received, for example, sequentially within a time period from time step 1 to time step t. Each character (or in some examples, groups of characters) in the character input sequence corresponds to a respective time step in the time period. In some examples, the character input sequence is represented by the vector (or spatial representation), $\{p(t)\}$. The current character input is the character input received at the current time step t of the time period, and is represented by the vector (or spatial representation), $p(t)$. In a specific example, the character input sequence is the Chinese Pinyin input "zhong g," where the last Pinyin character "g" is the current character input of the character input sequence. In some examples, the current character input $p(t)$ is a vector of dimension J.

At block 804, a first current character context $a(t)$ in the first writing system is determined. In particular, the first current character context $a(t)$ in the first writing system is determined based on the current character input $p(t)$ received at block 802 and a first previous character context $a(t-1)$ in the first writing system. The first previous character context $a(t-1)$ is, for example, a vector representation of the portion of the character input sequence that was received prior to the time step t (e.g., from time step 1 to time step $t-1$). The first previous character context $a(t-1)$ is determined in a similar manner as first current character context $a(t)$, but at the previous time step $t-1$. In some examples, the first current character context $a(t)$ is determined at the current time step t by a first character context unit (e.g., first character context unit 714) of a neural network for unified text conversion and prediction (e.g., network 700). Specifically, in some examples, the first current character context $a(t)$ is determined according to equation (1), described above. The first current character context $a(t)$ is a character-level feature representation of the current character input given the first previous character context $a(t-1)$. In some examples, the first current character context $a(t)$ is provided as a vector of dimension F.

Determining the first current character context $a(t)$ based on the current character input $p(t)$ received at block 802 and a first previous character context $a(t-1)$ in the first writing system can be advantageous for improving the accuracy and robustness of text conversion and prediction. In particular, it enables the history of character input (e.g., the first previous character context $a(t-1)$ to inform text prediction and conversion. As a result, text prediction and conversion can be performed with greater accuracy and reliability.

At block 806, a probability distribution $q(t)$ over a first character inventory in the first writing system is determined. The first character inventory is an inventory of J characters in the first writing system. For instance, if the first writing system is Chinese Pinyin, the first character inventory includes each of the letters of the Latin alphabet (J=26). The probability distribution $q(t)$ over the first character inventory is determined based on the first current character context $a(t)$ of block 804. In some examples, block 806 is determined using a first character distribution unit (e.g., first character distribution unit 716) of a neural network for unified text conversion and prediction. Specifically, in some examples, the probability distribution $q(t)$ over the first character inventory is determined according to equation (2), described above. The probability distribution $q(t)$ over the first character inventory includes probability values for each character in the first character inventory given the first current character context $a(t)$. For example, if the character input sequence were the Pinyin sequence "zhong g," the probability distribution $q(t)$ over the first character inventory would include the probability of the Pinyin character "g" given the character context "zhong" (i.e., P(g|zhong)).

In some examples, determining the probability distribution $q(t)$ over the first character inventory based on the first current character context $a(t)$ can be advantageous for improving the flexibility and robustness of text conversion and prediction. In particular, it can enable the model to handle auto-correction at the pinyin level, as well as abbreviated and fuzzy pinyin input. This can be achieved by, for example, including in the training data suitable mistyped, abbreviated, and/or fuzzy pinyin syllables, as appropriate.

At block 808, a character representation $x(t)$ in the second writing system for the current character input $p(t)$ is determined. In some examples, the character representation $x(t)$ is determined based on the current character input $p(t)$. For example, if the current character input $p(t)$ were the Chinese Pinyin input "g" and the second writing system were Chinese Hanzi characters, then the character representation $x(t)$ would be a vector representation of a current Chinese Hanzi character (e.g., 国 ) that corresponds to the Chinese Pinyin input "g."

In some examples, the determination of the character representation x(t) depends on whether the current character represented by the character representation x(t) is within a second character inventory ("in inventory") or outside the second character inventory ("out of inventory"). The second character inventory is, for example, an inventory of M characters in the second writing system. For instance, if the second writing system were Chinese Hanzi, the second character inventory can include M Chinese Hanzi characters. In some examples, whether the current character represented by the character representation x(t) is "in inventory" or "out of inventory" is based on a previous probability distribution over a character class inventory in the second writing system determined at block 810. In some examples, the character representation x(t) is provided as a vector of dimension M. In other examples, the character representation x(t) is provided as a vector of dimension M+1, where the $(M+1)^{th}$ bit indicates whether the current character represented by the character representation x(t) is "in inventory" or "out of inventory."

At block 810, a previous probability distribution v(t−1) over a character class inventory in the second writing system is determined. The previous probability distribution v(t−1) over the character class inventory is determined in a similar manner as the probability distribution v(t) over the character class inventory, described below with reference to block 822, except that the previous probability distribution v(t−1) over the character class inventory is determined at the previous time step t−1 rather than the current time step t. The character class inventory is an inventory of L character classes in the second writing system. One of the character classes in the character class inventory is an "unknown" character class that does not correspond to any subset of characters in the second character inventory. Each of the other character classes in the character class inventory corresponds to a respective subset of characters in the second character inventory. In particular, each character class other than the "unknown" character class represents a category of characters having similar characteristics (e.g., phonetic, semantic, syntactic, morphologic, frequency of use, or any combination thereof). The previous probability distribution v(t−1) over the character class inventory is determined based on a second previous character context b(t−1) in the second writing system. The second previous character context b(t−1) is determined in a similar manner as the second current character context b(t), described below with reference to block 818, except that the second previous character context b(t−1) is determined at the previous time step t−1 rather than the current time step t. The previous probability distribution v(t−1) over the character class inventory includes probability values for each character class in the character class inventory given the second previous character context b(t−1).

At block 812, a determination is made as to whether a previous predicted character in the second writing system corresponds to a character in the second character inventory (e.g., "in inventory"). The previous predicted character is, for example, a predicted character in the second writing system determined at the previous time step t−1 given the second previous character context b(t−1). In some examples, the determination of block 812 is made based on the previous probability distribution v(t−1) over the character class inventory. In particular, if the previous probability distribution v(t−1) over the character class inventory indicates that the most likely character class in the character class inventory is a character class other than the "unknown" character class, then the previous predicted character in the second writing system is determined to correspond to a character in the second character inventory. In these examples, the second character inventory is determined to include the current character represented by the character representation x(t) ("in inventory").

Alternatively, if the previous probability distribution v(t−1) over the character class inventory indicates that the most likely character class in the character class inventory is the "unknown" character class, then the previous predicted character in the second writing system is determined to not correspond to any character in the second character inventory. In these examples, the second character inventory is determined to not include the current character represented by the character representation x(t) ("out of inventory").

In response to determining that the previous predicted character in the second writing system corresponds to a character of the second character inventory (i.e., the character representation x(t) represents an "in inventory" character), block 814 is performed. In particular, at block 814, the character representation x(t) is generated using a first encoding. In some examples, the first encoding is a sparse encoding, such as a 1-of-M encoding, or a 1-of-(M+1) encoding. In some examples, the character representation x(t) is determined at block 814 using a first lexicon having a vocabulary of M characters in the second writing system. Specifically, based on the current character input p(t), a corresponding character in the second writing system is determined using the first lexicon and the character representation x(t) for that determined character is generated using the first encoding. For example, if the current character input p(t) is the Pinyin input "g," it can be determined using the first lexicon that the Pinyin input "g" corresponds to the beginning of the Pinyin syllable "guo," which corresponds to the Chinese Hanzi character "国." In this example, the Chinese Hanzi character "国" is a character in the second character inventory and the character representation x(t) representing the Chinese Hanzi character "国" is generated using the first encoding.

In response to determining that the previous predicted character does not correspond to any character of the second character inventory (i.e., the character representation x(t) represents an "out of inventory" character), block 816 is performed. In particular, at block 816, the character representation x(t) is generated using a second encoding. In some examples, the second encoding is a dense encoding that is denser than the first encoding. In some examples, a previous probability distribution y(t−1) over the second character inventory is determined based on the second previous character context b(t−1). The previous probability distribution y(t−1) over the second character inventory is determined in a similar manner as the probability distribution y(t) over the second character inventory, described below with reference to block 820, except that the previous probability distribution y(t−1) over the second character inventory is determined at the previous time step t−1 rather than the current time step t. Notably, the previous probability distribution y(t−1) over the second character inventory uses the second (dense) encoding because it spans the full dimension M associated with the size of the second character inventory. In some examples, the character representation x(t) is generated such that it includes the previous probability distribution y(t−1) over the second character inventory.

Utilizing two different encodings for the character representation x(t) depending on whether the current character represented by the character representation x(t) is "in inventory" or "out of inventory" can be advantageous for keeping the size of the unified text conversion and prediction model (e.g., network 700) tractable while maintaining a meaningful way to represent characters that are not found in the second character inventory. For example, the second character inventory in the second writing system can be kept at a tractable size. This can allow unified text conversion and prediction to be performed accurately and reliably according to the techniques described herein while keeping the size of the model sufficiently small such that it can be feasibly implemented on a user device (e.g., a portable electronic device, such as a mobile phone).

At block 818, a second current character context $b(t)$ in a second writing system is determined. The second current character context $b(t)$ is determined based on the first current character context $a(t)$, the second previous character context $b(t-1)$, and the character representation $x(t)$. More specifically, the second current character context $b(t)$ is determined based on the probability distribution $q(t)$ over the first character inventory (which is based on first current character context $a(t)$), the second previous character context $b(t-1)$, and the character representation $x(t)$. In some examples, the second current character context $b(t)$ is determined at the current time step t by a second character context unit (e.g., second character context unit 718) of a neural network for unified text conversion and prediction (e.g., network 700). Specifically, in some examples, the second current character context $b(t)$ is determined according to equation (3), described above. The second current character context $b(t)$ is a character-level feature representation of the current character in the second writing system given the probability distribution $q(t)$ over the first character inventory, the second previous character context $b(t-1)$, and the character representation $x(t)$. In some examples, the second current character context $b(t)$ is a vector of dimension G.

In some examples, the entire probability distribution $q(t)$ over the first character inventory is used to determine the second current character context $b(t)$. In other words, the probability distribution $q(t)$ over the first character inventory is not pruned, where the probability values of only certain characters in the first character inventory are used to determine the second current character context $b(t)$. Instead, the probability values for all characters in the first character inventory are used to determine the second current character context $b(t)$.

Determining the second current character context $b(t)$ using the entire probability distribution $q(t)$ over the first character inventory (e.g., without pruning) can be advantageous for improving the accuracy and robustness of text conversion and prediction. In particular, it can allow text prediction to be performed based on all possible text conversion candidates, thereby providing a more comprehensive and reliable unified text conversion and prediction solution.

At block 820, a probability distribution $y(t)$ over the second character inventory in the second writing system is determined. In particular, the probability distribution $y(t)$ over the second character inventory is determined based on the second current character context $b(t)$ determined at block 818. As discussed above, the second character inventory is an inventory of M characters in the second writing system. In some examples, one or more of blocks 822-826 are performed to determine the probability distribution $y(t)$ over the second character inventory.

At block 822, a probability distribution $v(t)$ over the character class inventory is determined. In particular, the probability distribution $v(t)$ over the character class inventory is determined based on the second current character context $b(t)$. In some examples, block 822 is determined using a second character class distribution unit (e.g., second character class distribution unit 720) of a neural network for unified text conversion and prediction (e.g., network 700). Specifically, in some examples, the probability distribution $v(t)$ over the character class inventory is determined according to equation (4), described above.

As discussed above, the character class inventory is an inventory of L character classes in the second writing system. One of the character classes in the character class inventory is an "unknown" character class that does not correspond to any subset of characters in the second character inventory. Each of the other character classes in the character class inventory corresponds to a respective subset of characters in the second character inventory. Thus, each character class other than the "unknown" character class represents a category of characters having similar characteristics (e.g., phonetic, semantic, syntactic, morphologic, frequency of use, or any combination thereof). The probability distribution $v(t)$ over the character class inventory includes probability values for each character class in the character class inventory given the second current character context $b(t)$. In some examples, the probability distribution $v(t)$ over the character class inventory is a vector of dimension L.

At block 824, a character class of the character class inventory is selected based on the determined probability distribution $v(t)$ over the character class inventory. In some examples, the selected character class is the character class corresponding to the highest probability value in the probability distribution $v(t)$ over the character class inventory. In some examples, a determination is made as to whether the selected character class is the "unknown" character class that does not correspond to any subset of characters in the second character inventory. If the selected character class is not the "unknown" character class, then the current predicted character in the second writing system is determined to be within the second character inventory ("in inventory"). In these examples, in response to determining that the selected character class is not the "unknown" character class, block 826 is performed.

At block 826, a probability distribution $y_v(t)$ over a subset of the second character inventory is determined. In particular, the probability distribution $y_v(t)$ over the subset of the second character inventory is determined based on the second current character context $b(t)$. The subset of the second character inventory corresponds to the selected character class of the character class inventory. Specifically, each character in the subset of the second character inventory is predefined to belong to the selected character class. In some examples, block 826 is determined using a second character distribution unit (e.g., second character distribution unit 722) of a neural network for unified text conversion and prediction (e.g., network 700). Specifically, in some examples, the probability distribution $y_v(t)$ over the subset of the second character inventory is determined according to equation (5), described above.

In the present example, where the selected character class of block 824 is not the "unknown" character class, the probability distribution $y(t)$ over the second character inventory is determined at block 820 based on the probability distribution $v(t)$ over the character class inventory (block 822) and the probability distribution $y_v(t)$ over the subset of the second character inventory (block 826). Specifically, the probability distribution $y(t)$ over the second character inventory is determined based on the element-wise product of the probability distribution v(t) over the character class inventory (block 822) and the probability distribution $y_v(t)$ over the subset of the second character inventory (block 826), according to equation (6), described above.

Referring back to block 824, if the selected character class is the "unknown" character class, then the current predicted character in the second writing system is determined not to be within the second character inventory ("out of inventory"). In these examples, in response to determining that the selected character class is the "unknown" character class, the probability distribution y(t) over the second character inventory is determined (e.g., using second character distribution unit 722) directly from second current character context b(t), according to equation (7), described above.

The probability distribution y(t) over the second character inventory includes probability values for each character in the second character inventory given the second current character context b(t). In some examples, probability distribution y(t) over the second character inventory is a vector of dimension M.

At block 828, a word representation w(t) in the second writing system for the character representation x(t) is determined. In some examples, the word representation w(t) is determined based on the current character in the second writing system represented by character representation x(t). For example, if the character representation x(t) were the Chinese Hanzi character "国," then the word representation w(t) would be a vector representation of a Chinese word (e.g., 中国 (China)) that corresponds to the Chinese Hanzi character "国."

In some examples, the determination of word representation w(t) depends on whether the current word represented by the word representation w(t) is within the word inventory ("in inventory") or outside the word inventory ("out of inventory"). As discussed, the word inventory is, for example, an inventory of N words in the second writing system. For instance, if the second writing system were Chinese Hanzi, the word inventory would include N Chinese words. In some examples, whether the current word represented by the word representation w(t) is "in inventory" or "out of inventory" is based on a previous probability distribution over a word class inventory in the second writing system determined at block 830. In some examples, the word representation w(t) is provided as a vector of dimension N. In other examples, the word representation w(t) is provided as a vector of dimension N+1, where the (N+1)$^{th}$ bit indicates whether the current character represented by the character representation x(t) is "in inventory" or "out of inventory."

At block 830, a previous probability distribution u(t−1) over a word class inventory in the second writing system is determined. The previous probability distribution u(t−1) over the word class inventory is determined in a similar manner as the probability distribution u(t) over the word class inventory, described below with reference to block 842, except that the previous probability distribution u(t−1) over the word class inventory is determined at the previous time step t−1 rather than the current time step t. As discussed above, the word class inventory is an inventory of K word classes in the second writing system. One of the word classes in the word class inventory is an "unknown" word class that does not correspond to any subset of words in the second character inventory. Each of the other word classes in the word class inventory corresponds to a respective subset of words in the word inventory. In particular, each word class other than the "unknown" word class represents a category of words having similar characteristics (e.g., phonetic, semantic, syntactic, morphologic, frequency of use, or any combination thereof). The previous probability distribution u(t−1) over the word class inventory is determined based on a previous word context c(t−1) in the second writing system. The previous word context c(t−1) is determined in a similar manner as the current word context c(t), described below with reference to block 838, except that the previous word context c(t−1) is determined at the previous time step t−1 rather than the current time step t. The previous probability distribution u(t−1) over the word class inventory includes probability values for each word class in the word class inventory given the previous word context c(t−1).

At block 832, a determination is made as to whether a previous predicted word in the second writing system corresponds to a word in the word inventory (e.g., "in inventory"). The previous predicted word is, for example, a predicted word in the second writing system determined at the previous time step t−1 given the previous word context c(t−1). In some examples, the determination at block 832 is made based on the previous probability distribution u(t−1) over the word class inventory. In particular, if the previous probability distribution u(t−1) over the word class inventory indicates that the most likely word class in the word class inventory is a word class other than the "unknown" word class, then the previous predicted word in the second writing system is determined to correspond to a word in the word inventory. In these examples, the word inventory is determined to include the current word represented by the word representation w(t) ("in inventory").

Alternatively, if the previous probability distribution u(t−1) over the word class inventory indicates that the most likely word class in the word class inventory is the "unknown" word class, then the previous predicted word in the second writing system is determined to not correspond to any word in the word inventory. In these examples, the word inventory is determined to not include the current word represented by the word representation w(t) ("out of inventory").

In response to determining that the previous predicted word in the second writing system corresponds to a word of the word inventory (i.e., the word representation w(t) represents an "in inventory" word), block 834 is performed. In particular, at block 834, the word representation w(t) is generated using a third encoding. In some examples, the third encoding is a sparse encoding, such as a 1-of-N encoding, or a 1-of-(N+1) encoding. In some examples, the word representation w(t) is determined at block 834 using a second lexicon having a vocabulary of N words in the second writing system. Specifically, based on the character representation x(t), a corresponding word in the second writing system is determined using the second lexicon and the word representation w(t) for that determined word is generated using the third encoding. For example, if the character representation x(t) represents the Chinese Hanzi character "国," it can be determined using the second lexicon that the Chinese Hanzi character "国" corresponds to the end of the Chinese word "中国" (China). In this example, the Chinese word "中国" (China) is a word in the word inventory and the word representation w(t) representing the Chinese word "中国" (China) is generated using the third encoding.

In response to determining that the previous word context c(t−1) does not correspond to any word of the word inventory (i.e., the word representation w(t) represents an "out of inventory" word), block 836 is performed. In particular, at block 836, the word representation w(t) is generated using a fourth encoding. In some examples, the fourth encoding is a dense encoding that is denser than the third encoding. In some examples, a previous probability distribution z(t−1) over the word inventory is determined based on the previous word context c(t−1). The previous probability distribution z(t−1) over the word inventory is determined in a similar manner as the probability distribution z(t) over the word inventory, described below with reference to block 840, except that the previous probability distribution z(t−1) over the word inventory is determined at the previous time step t−1 rather than the current time step t. Notably, the previous probability distribution z(t−1) over the word inventory uses the fourth (dense) encoding because it spans the full dimension N associated with the size of the word inventory. The word representation w(t) is generated such that it includes the previous probability distribution z(t−1) over the word inventory.

Utilizing two different encodings for the word representation w(t) depending on whether the current word represented by the word representation w(t) is "in inventory" or "out of inventory" can be advantageous for keeping the size of the unified text conversion and prediction model (e.g., network 700) tractable while maintaining a meaningful way to represent words that are not found in the word inventory. For example, the word inventory in the second writing system can be kept at a tractable size. This can allow unified text conversion and prediction to be performed accurately and reliably according to the techniques described herein while keeping the size of the model sufficiently small such that it can be feasibly implemented on a user device (e.g., a portable electronic device, such as a mobile phone).

At block 838, a current word context c(t) in the second writing system is determined. The current word context c(t) is determined based on the second current character context b(t), the previous word context c(t−1), and the word representation w(t). More specifically, the current word context c(t) is determined based on the probability distribution y(t) over the second character inventory (which is based on second current character context b(t)), the previous word context c(t−1), and the word representation w(t). In some examples, the current word context c(t) is determined at the current time step t by a word context unit (e.g., word context unit 724) of a neural network for unified text conversion and prediction (e.g., network 700). Specifically, the current word context c(t) is determined according to equation (8), described above. The current word context c(t) is a word-level feature representation of the current word in the second writing system given the probability distribution y(t) over the second character inventory, the previous word context c(t−1), and the word representation w(t). In some examples, the current word context c(t) is a vector of dimension H.

In some examples, the entire probability distribution y(t) over the second character inventory is used to determine the current word context c(t). In other words, the probability distribution y(t) over the second character inventory is not pruned, where the probability values of only certain characters in the second character inventory are used to determine the current word context w(t). Instead, the probability values for all characters in the second character inventory are used to determine the current word context c(t).

Determining the current word context c(t) using the entire probability distribution y(t) over the second character inventory (e.g., without pruning) can be advantageous for improving the accuracy and robustness of text conversion and prediction. In particular, it can allow text prediction to be performed based on all possible text conversion candidates, thereby providing a more comprehensive and reliable unified text conversion and prediction solution.

At block 840, a probability distribution z(t) over the word inventory in the second writing system is determined. In particular, the probability distribution w(t) over the word inventory is determined based on the current word context c(t) determined at block 838. As discussed above, the word inventory is an inventory of N words in the second writing system. In some examples, one or more of blocks 842-846 are performed to determine the probability distribution z(t) over the word inventory.

At block 842, a probability distribution u(t) over the word class inventory is determined. In particular, the probability distribution u(t) over the character class inventory is determined based on the current word context c(t). In some examples, block 842 is determined using a word class distribution unit (e.g., word class distribution unit 726) of a neural network for unified text conversion and prediction (e.g., network 700). Specifically, in some examples, the probability distribution u(t) over the word class inventory is determined according to equation (9), described above.

As discussed above, the word class inventory is an inventory of K word classes in the second writing system. One of the word classes in the word class inventory is an "unknown" word class that does not correspond to any subset of words in the word inventory. Each of the other word classes in the word class inventory corresponds to a respective subset of words in the word inventory. Thus, each word class other than the "unknown" character class represents a category of words having similar characteristics (e.g., phonetic, semantic, syntactic, morphologic, frequency of use, or any combination thereof). The probability distribution u(t) over the word class inventory includes probability values for each word class in the word class inventory given the current word context c(t). In some examples, the probability distribution u(t) over the word class inventory is a vector of dimension K.

At block 844, a word class of the word class inventory is selected based on the determined probability distribution u(t) over the word class inventory. In some examples, the selected word class is the word class corresponding to the highest probability value in the probability distribution u(t) over the word class inventory. In some examples, a determination is made as to whether the selected word class is the "unknown" word class that does not correspond to any subset of words in the word inventory. If the selected word class is not the "unknown" word class, then the current predicted word in the second writing system is determined to be within the word inventory ("in inventory"). In these examples, in response to determining that the selected word class is not the "unknown" word class, block 846 is performed.

At block 846, a probability distribution $z_u(t)$ over a subset of the word inventory is determined. In particular, the probability distribution $z_u(t)$ over the subset of the word inventory is determined based on the current word context c(t). The subset of the word inventory corresponds to the selected word class of the word class inventory. Specifically, each word in the subset of the word inventory is predefined to belong to the selected word class. In some examples, block 846 is determined using a word distribution unit (e.g., word distribution unit 728) of a neural network for unified text conversion and prediction (e.g., network 700). Specifically, in some examples, the probability distribution $z_u(t)$ over the subset of the word inventory is determined according to equation (10), described above.

In the present example, where the selected word class of block 844 is not the "unknown" word class, the probability distribution z(t) over the word inventory is determined at block 840 based on the probability distribution u(t) over the word class inventory (block 842) and the probability distribution $z_u(t)$ over the subset of the word inventory (block 846). Specifically, the probability distribution z(t) over the word inventory is determined based on the element-wise product of the probability distribution u(t) over the word class inventory (block 842) and the probability distribution $z_u(t)$ over the subset of the word inventory (block 846), according to equation (11), described above.

Referring back to block 844, if the selected word class is the "unknown" character class, then the current predicted word in the second writing system is determined not to be within the word inventory ("out of inventory"). In these examples, in response to determining that the selected word class is the "unknown" word class, the probability distribution z(t) over the word inventory is determined (e.g., using word distribution unit 728) directly from current word context c(t) according to equation (12), described above.

The probability distribution z(t) over the word inventory includes probability values for each word in the word inventory given the current word context c(t). In some examples, probability distribution z(t) over the word inventory is a vector of dimension N.

Although blocks 802 through 846 are described with reference to a current character input at time step t to determine a corresponding probability distribution z(t) over the word inventory, it should be recognized that blocks 802 through 846 can be performed for each character input of the character input sequence over a sequence of time steps to obtain corresponding probability distributions z(t) over the word inventory for each respective character input. For example, given the Pinyin character sequence "ping guo zai zhong guo," blocks 802 through 846 can be performed for each Pinyin character of the Pinyin character sequence to determine corresponding probability distributions z(t) over a Chinese word inventory for each respective Pinyin character. Candidate Chinese word sequences (e.g., 苹果在中国 or 平果在中国) that each correspond to the Pinyin character sequence can then be determined (e.g., block 848) using the probability distribution z(t).

At block 848, one or more word sequences for the character input sequence are determined based on the probability distribution z(t) over the word inventory of block 846. The one or more word sequences are word sequences of the second writing system. Each word sequence corresponds to the character input sequence of block 802. For example, using the probability distributions over the word inventory from block 848 for each character input of each time step, predicted words in the second writing system are arranged in a lattice to determine candidate predicted word sequences in the second writing system that correspond to the character input sequence. Each candidate predicted word sequence is associated with a probability score. In some examples, the n-best candidate predicted word sequences are determined based on the probability scores (e.g., using a Viterbi search algorithm). The n-best candidate predicated word sequences are the candidate predicated word sequences associated with the n-highest probability scores, where n is a predetermined integer greater than zero. Block 848 is performed, for example, using a decoder module (e.g., decoder module 608) of a text conversion and prediction module.

At block 850, the one or more word sequences of block 848 are provided for output. For instance, in some examples, the n-best candidate predicted word sequences of block 848 are displayed on a text input interface for user selection. For example, as shown in FIG. 9, candidate predicted word sequence 908 corresponding to character input sequence 910 is displayed on text input interface 906 of device 900 for user selection. In some examples, the n-best candidate predicted word sequences are displayed on the text input interface according to their probability scores (e.g., from highest to lowest). By utilizing process 800 for unified text conversion and prediction, the candidate predicted word sequences provided by the device (e.g., on text input interface 906) are more likely to coincide with the word sequence intended by the user. This results in a more robust and accurate word conversion and prediction solution.

Although process 800 describes examples of representing unobserved linguistic events (e.g., using a dense encoding for characters or words that are "out of inventory) in a recurrent neural network (e.g., network 700) in the context of unified text conversion and prediction, it should be recognized that such representation of unobserved linguistic events can be generally applied to other processes that implement recurrent neural network language modeling. Specifically, the dense encoding for a predicted word/character in the previous time step can be used to represent the current word/character input that may be "out of inventory." At the same time, a sparse encoding can still be utilized to represent the current word/character if it is "in inventory."

In accordance with some implementations, a computer-readable storage medium (e.g., a non-transitory computer-readable storage medium) is provided, the computer-readable storage medium storing one or more programs for execution by one or more processors of an electronic device, the one or more programs including instructions for performing any of the methods described herein.

In accordance with some implementations, an electronic device (e.g., a multifunctional device) is provided that comprises means for performing any of the methods described herein.

In accordance with some implementations, an electronic device (e.g., a multifunctional device) is provided that comprises a processing unit configured to perform any of the methods described herein.

In accordance with some implementations, an electronic device (e.g., a multifunctional device) is provided that comprises one or more processors and memory storing one or more programs for execution by the one or more processors, the one or more programs including instructions for performing any of the methods described herein.

The operations described above with reference to FIGS. 8A-8D are, optionally, implemented by components depicted in FIG. 1A-1B, 3, or 6. For example, the operations of process 800 may be implemented by one or more of operating system 126, applications module 136, text input module 134, text conversion and prediction module 600, or processor(s) 120, 310. Similarly, it would be clear to a person having ordinary skill in the art how other processes can be implemented based on the components depicted in FIG. 1A-1B, 3, or 6.

The foregoing description, for purposes of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A method comprising: at an electronic device having one or more processors and memory:
receiving a current character input of a character input sequence, the character input sequence representing characters of a first writing system, wherein the character input sequence includes a first previous character input received immediately prior to the current character input and a first subsequent character input received immediate after the current character input;
determining a first current character context in the first writing system based on the received current character input and a first previous character context in the first writing system, wherein the first current character context represents context of a first portion of the character input sequence received prior to the first subsequent character input, and wherein the first previous character context represents context of a second portion of the character input sequence received prior to the current character input;
determining a second current character context in a second writing system based on the first current character context in the first writing system, a second previous character context in the second writing system, and a character representation in the second writing system for the current character input;
determining a current word context in the second writing system based on the second current character context in the second writing system, a previous word context in the second writing system, and a word representation in the second writing system for the character representation;
determining, based on the current word context in the second writing system, a probability distribution over a word inventory in the second writing system;
determining, based on the probability distribution over the word inventory, one or more word sequences in the second writing system for the character input sequence; and
providing the one or more word sequences for output.

2. The method of claim 1, further comprising:
determining, based on the first current character context in the first writing system, a probability distribution over a first character inventory in the first writing system, wherein determining the second current character context in the second writing system is further based on the probability distribution over the first character inventory in the first writing system.

3. The method of claim 1, further comprising:
determining, based on the current character input, the character representation in the second writing system for the current character input.

4. The method of claim 1, further comprising:
determining, based on the second current character context in the second writing system, a probability distribution over a second character inventory in the second writing system, wherein determining the current word context in the second writing system is further based on the probability distribution over the second character inventory.

5. The method of claim 1, further comprising:
determining, based on the second current character context in the second writing system, a probability distribution over a character class inventory in the second writing system, wherein the character class inventory includes a plurality of character classes that each correspond to a respective subset of a second character inventory in the second writing system; and
selecting a character class of the character class inventory based on the determined probability distribution over the character class inventory, wherein determining the probability distribution over the second character inventory is further based on the probability distribution over the character class inventory.

6. The method of claim 1, further comprising:
determining, based on the character representation in the second writing system for the current character input, the word representation in the second writing system for the character representation.

7. The method of claim 1, further comprising:
determining, based on the current word context in the second writing system, a probability distribution over a word class inventory in the second writing system, wherein the word class inventory includes a plurality of word classes that each correspond to a respective subset of the word inventory in the second writing system; and
selecting a word class of the word class inventory based on the determined probability distribution over the word class inventory in the second writing system, wherein determining the probability distribution over the word inventory in the second writing system is further based on the probability distribution over the word class inventory in the second writing system.

8. The method of claim 1, further comprising:
determining, based on the second previous character context in the second writing system, a previous probability distribution over the character class inventory in the second writing system;
determining, based on the previous probability distribution over the character class inventory, whether a previous predicted character in the second writing system corresponds to a character of a second character inventory in the second writing system; and
in response to determining that the previous predicted character in the second writing system corresponds to a character of a second character inventory in the second writing system, generating the character representation in the second writing system for the current character input using a first encoding.

9. The method of claim 1, further comprising:
determining, based on the previous word context in the second writing system, a previous probability distribution over the word class inventory in the second writing system;
determining, based on the previous probability distribution over the word class inventory, whether a previous predicted word in the second writing system corresponds to a word of the word inventory; and in response to determining that the previous predicted word in the second writing system corresponds to a word of the word inventory, generating the word representation in the second writing system for the character representation using a third encoding.

10. An electronic device, comprising:
one or more processors; and
memory storing one or more programs configured to be executed by the one or more processors, the one or more programs including instructions for:
receiving a current character input of a character input sequence, the character input sequence representing characters of a first writing system, wherein the character input sequence includes a first previous character input received immediately prior to the current character input and a first subsequent character input received immediate after the current character input;
determining a first current character context in the first writing system based on the received current character input and a first previous character context in the first writing system, wherein the first current character context represents context of a first portion of the character input sequence received prior to the first subsequent character input, and wherein the first previous character context represents context of a second portion of the character input sequence received prior to the current character input;
determining a second current character context in a second writing system based on the first current character context in the first writing system, a second previous character context in the second writing system, and a character representation in the second writing system for the current character input;
determining a current word context in the second writing system based on the second current character context in the second writing system, a previous word context in the second writing system, and a word representation in the second writing system for the character representation;
determining, based on the current word context in the second writing system, a probability distribution over a word inventory in the second writing system;
determining, based on the probability distribution over the word inventory, one or more word sequences in the second writing system for the character input sequence; and
providing the one or more word sequences for output.

11. The device of claim 10, wherein the one or more programs further include instructions for:
determining, based on the first current character context in the first writing system, a probability distribution over a first character inventory in the first writing system, wherein determining the second current character context in the second writing system is further based on the probability distribution over the first character inventory in the first writing system.

12. The device of claim 11, wherein the entire probability distribution over the first character inventory is used to determine the second current character context in the second writing system.

13. The device of claim 10, wherein the one or more programs further include instructions for:
determining, based on the current character input, the character representation in the second writing system for the current character input.

14. The device of claim 13, wherein the character representation in the second writing system for the current character input is determined using a first lexicon having a vocabulary of M characters in the second writing system, and wherein M is a positive integer.

15. The device of claim 10, wherein the one or more programs further include instructions for:
determining, based on the second current character context in the second writing system, a probability distribution over a second character inventory in the second writing system, wherein determining the current word context in the second writing system is further based on the probability distribution over the second character inventory.

16. The device of claim 15, wherein the entire probability distribution over the second character inventory is used to determine the current word context in the second writing system.

17. The device of claim 10, wherein the one or more programs further include instructions for:
determining, based on the second current character context in the second writing system, a probability distribution over a character class inventory in the second writing system, wherein the character class inventory includes a plurality of character classes that each correspond to a respective subset of a second character inventory in the second writing system; and
selecting a character class of the character class inventory based on the determined probability distribution over the character class inventory, wherein determining the probability distribution over the second character inventory is further based on the probability distribution over the character class inventory.

18. The device of claim 17, wherein the one or more programs further include instructions for:
determining, based on the second current character context in the second writing system, a probability distribution over a subset of the second character inventory, the subset of the second character inventory corresponding to the selected character class of the character class inventory,
wherein determining the probability distribution over the second character inventory is further based on the probability distribution over the subset of the second character inventory.

19. The device of claim 18, wherein the probability distribution over the second character inventory comprises an element-wise product of the probability distribution over the character class inventory in the second writing system and the probability distribution over the subset of the second character inventory in the second writing system.

20. The device of claim 10, wherein the one or more programs further include instructions for:
determining, based on the character representation in the second writing system for the current character input, the word representation in the second writing system for the character representation.

21. The device of claim 20, wherein the word representation in the second writing system for the character representation is determined using a second lexicon having a vocabulary of N words in the second writing system, and wherein N is a positive integer.

22. The device of claim 10, wherein the one or more programs further include instructions for:
determining, based on the current word context in the second writing system, a probability distribution over a word class inventory in the second writing system, wherein the word class inventory includes a plurality of word classes that each correspond to a respective subset of the word inventory in the second writing system; and
selecting a word class of the word class inventory based on the determined probability distribution over the word class inventory in the second writing system, wherein determining the probability distribution over the word inventory in the second writing system is further based on the probability distribution over the word class inventory in the second writing system.

23. The device of claim 22, wherein the one or more programs further include instructions for:
determining, based on the current word context in the second writing system, a probability distribution over a subset of the word inventory, the subset of the word inventory corresponding to the selected word class of the word class inventory,
wherein determining the probability distribution over the word inventory is further based on the probability distribution over the subset of the word inventory.

24. The device of claim 23, wherein the probability distribution over the word inventory comprises an element-wise product of the probability distribution over the word class inventory in the second writing system and the probability distribution over the subset of the word inventory in the second writing system.

25. The device of claim 10, wherein the one or more programs further include instructions for:
determining, based on the second previous character context in the second writing system, a previous probability distribution over the character class inventory in the second writing system;
determining, based on the previous probability distribution over the character class inventory, whether a previous predicted character in the second writing system corresponds to a character of a second character inventory in the second writing system; and
in response to determining that the previous predicted character in the second writing system corresponds to a character of a second character inventory in the second writing system, generating the character representation in the second writing system for the current character input using a first encoding.

26. The device of claim 25, wherein the one or more programs further include instructions for:
in response to determining that the previous predicted character in the second writing system does not correspond to any character of the second character inventory in the second writing system:
determining a previous probability distribution over the second character inventory in the second writing system; and
generating the character representation in the second writing system for the current character input using a second encoding, wherein the character representation in the second writing system for the current character input includes the previous probability distribution over the second character inventory in the second writing system.

27. The device of claim 10, wherein the one or more programs further include instructions for:
determining, based on the previous word context in the second writing system, a previous probability distribution over the word class inventory in the second writing system;
determining, based on the previous probability distribution over the word class inventory, whether a previous predicted word in the second writing system corresponds to a word of the word inventory; and
in response to determining that the previous predicted word in the second writing system corresponds to a word of the word inventory, generating the word representation in the second writing system for the character representation using a third encoding.

28. The device of claim 27, wherein the one or more programs further include instructions for:
in response to determining that the previous predicted word in the second writing system does not correspond to any word of the word inventory:
determining a previous probability distribution over the word inventory in the second writing system, and
generating the word representation in the second writing system for the character representation using a fourth encoding, wherein the word representation in the second writing system for the character representation includes the previous probability distribution over the word inventory in the second writing system.

29. The device of claim 10, wherein the first writing system comprises Chinese Pinyin or Chinese Zhuyin and the second writing system comprises Chinese Hanzi.

30. A non-transitory computer-readable storage medium storing one or more programs configured to be executed by one or more processors of an electronic device with a display and memory, the one or more programs including instructions for:
receiving a current character input of a character input sequence, the character input sequence representing characters of a first writing system, wherein the character input sequence includes a first previous character input received immediately prior to the current character input and a first subsequent character input received immediate after the current character input;
determining a first current character context in the first writing system based on the received current character input and a first previous character context in the first writing system, wherein the first current character context represents context of a first portion of the character input sequence received prior to the first subsequent character input, and wherein the first previous character context represents context of a second portion of the character input sequence received prior to the current character input;
determining a second current character context in a second writing system based on the first current character context in the first writing system, a second previous character context in the second writing system, and a character representation in the second writing system for the current character input;
determining a current word context in the second writing system based on the second current character context in the second writing system, a previous word context in the second writing system, and a word representation in the second writing system for the character representation;
determining, based on the current word context in the second writing system, a probability distribution over a word inventory in the second writing system;
determining, based on the probability distribution over the word inventory, one or more word sequences in the second writing system for the character input sequence; and
providing the one or more word sequences for output.

31. The computer-readable storage medium of claim 30, wherein the one or more programs further include instructions for:
  determining, based on the first current character context in the first writing system, a probability distribution over a first character inventory in the first writing system, wherein determining the second current character context in the second writing system is further based on the probability distribution over the first character inventory in the first writing system.

32. The computer-readable storage medium of claim 31, wherein the entire probability distribution over the first character inventory is used to determine the second current character context in the second writing system.

33. The computer-readable storage medium of claim 30, wherein the one or more programs further include instructions for:
  determining, based on the current character input, the character representation in the second writing system for the current character input.

34. The computer-readable storage medium of claim 33, wherein the character representation in the second writing system for the current character input is determined using a first lexicon having a vocabulary of M characters in the second writing system, wherein M is a positive integer.

35. The computer-readable storage medium of claim 30, wherein the one or more programs further include instructions for:
  determining, based on the second current character context in the second writing system, a probability distribution over a second character inventory in the second writing system, wherein determining the current word context in the second writing system is further based on the probability distribution over the second character inventory.

36. The computer-readable storage medium of claim 35, wherein the entire probability distribution over the second character inventory is used to determine the current word context in the second writing system.

37. The computer-readable storage medium of claim 30, wherein the one or more programs further include instructions for:
  determining, based on the second current character context in the second writing system, a probability distribution over a character class inventory in the second writing system, wherein the character class inventory includes a plurality of character classes that each correspond to a respective subset of a second character inventory in the second writing system; and
  selecting a character class of the character class inventory based on the determined probability distribution over the character class inventory, wherein determining the probability distribution over the second character inventory is further based on the probability distribution over the character class inventory.

38. The computer-readable storage medium of claim 7, wherein the one or more programs further include instructions for:
  determining, based on the second current character context in the second writing system, a probability distribution over a subset of the second character inventory, the subset of the second character inventory corresponding to the selected character class of the character class inventory,
  wherein determining the probability distribution over the second character inventory is further based on the probability distribution over the subset of the second character inventory.

39. The computer-readable storage medium of claim 38, wherein the probability distribution over the second character inventory comprises a element-wise product of the probability distribution over the character class inventory in the second writing system and the probability distribution over the subset of the second character inventory in the second writing system.

40. The computer-readable storage medium of claim 30, wherein the one or more programs further include instructions for:
  determining, based on the character representation in the second writing system for the current character input, the word representation in the second writing system for the character representation.

41. The computer-readable storage medium of claim 40, wherein the word representation in the second writing system for the character representation is determined using a second lexicon having a vocabulary of N words in the second writing system, and wherein N is a positive integer.

42. The computer-readable storage medium of claim 30, wherein the one or more programs further include instructions for:
  determining, based on the current word context in the second writing system, a probability distribution over a word class inventory in the second writing system, wherein the word class inventory includes a plurality of word classes that each correspond to a respective subset of the word inventory in the second writing system; and
  selecting a word class of the word class inventory based on the determined probability distribution over the word class inventory in the second writing system, wherein determining the probability distribution over the word inventory in the second writing system is further based on the probability distribution over the word class inventory in the second writing system.

43. The computer-readable storage medium of claim 42, wherein the one or more programs further include instructions for:
  determining, based on the current word context in the second writing system, a probability distribution over a subset of the word inventory, the subset of the word inventory corresponding to the selected word class of the word class inventory,
  wherein determining the probability distribution over the word inventory is further based on the probability distribution over the subset of the word inventory.

44. The computer-readable storage medium of claim 43, wherein the probability distribution over the word inventory comprises a element-wise product of the probability distribution over the word class inventory in the second writing system and the probability distribution over the subset of the word inventory in the second writing system.

45. The computer-readable storage medium of claim 30, wherein the one or more programs further include instructions for:
  determining, based on the second previous character context in the second writing system, a previous probability distribution over the character class inventory in the second writing system;
  determining, based on the previous probability distribution over the character class inventory, whether a previous predicted character in the second writing system corresponds to a character of a second character inventory in the second writing system; and in response to determining that the previous predicted character in the second writing system corresponds to a character of a second character inventory in the second writing system, generating the character representation in the second writing system for the current character input using a first encoding.

46. The computer-readable storage medium of claim 45, wherein the one or more programs further include instructions for:

in response to determining that the previous predicted character in the second writing system does not correspond to any character of the second character inventory in the second writing system:

determining a previous probability distribution over the second character inventory in the second writing system; and generating the character representation in the second writing system for the current character input using a second encoding, wherein the character representation in the second writing system for the current character input includes the previous probability distribution over the second character inventory in the second writing system.

47. The computer-readable storage medium of claim 30, wherein the one or more programs further include instructions for:

determining, based on the previous word context in the second writing system, a previous probability distribution over the word class inventory in the second writing system;

determining, based on the previous probability distribution over the word class inventory, whether a previous predicted word in the second writing system corresponds to a word of the word inventory; and in response to determining that the previous predicted word in the second writing system corresponds to a word of the word inventory, generating the word representation in the second writing system for the character representation using a third encoding.

48. The computer-readable storage medium of claim 47, wherein the one or more programs further include instructions for:

in response to determining that the previous predicted word in the second writing system does not correspond to any word of the word inventory:

determining a previous probability distribution over the word inventory in the second writing system; and generating the word representation in the second writing system for the character representation using a fourth encoding, wherein the word representation in the second writing system for the character representation includes the previous probability distribution over the word inventory in the second writing system.

49. The computer-readable storage medium of claim 30, wherein the first writing system comprises Chinese Pinyin or Chinese Zhuyin and the second writing system comprises Chinese Hanzi.

* * * * *

UNITED STATES PATENT AND TRADEMARK OFFICE
CERTIFICATE OF CORRECTION

PATENT NO. : 10,282,416 B2
APPLICATION NO. : 15/673587
DATED : May 7, 2019
INVENTOR(S) : Jerome R. Bellegarda et al.

It is certified that error appears in the above-identified patent and that said Letters Patent is hereby corrected as shown below:

In the Claims

In Column 58, Line 15, Claim 28, delete "system," and insert -- system; --, therefor.

In Column 59, Line 59, Claim 38, delete "claim 7," and insert -- claim 37, --, therefor.

Signed and Sealed this
Eighteenth Day of June, 2019

Andrei Iancu
*Director of the United States Patent and Trademark Office*